US012762500B2

(12) United States Patent
Fung et al.

(10) Patent No.: US 12,762,500 B2
(45) Date of Patent: Oct. 13, 2026

(54) DIGITAL EMPLOYEE EXPERIENCE INDEX

(71) Applicant: Ivanti, Inc., South Jordan, UT (US)

(72) Inventors: Yun San Fung, Vancouver (CA); Mantinder Jit Singh, Vancouver (CA)

(73) Assignee: Ivanti, Inc., South Jordan, UT (US)

( * ) Notice: Subject to any disclaimer, the term of this patent is extended or adjusted under 35 U.S.C. 154(b) by 206 days.

(21) Appl. No.: 18/295,555

(22) Filed: Apr. 4, 2023

(65) Prior Publication Data

US 2023/0325756 A1 Oct. 12, 2023

Related U.S. Application Data

(60) Provisional application No. 63/327,594, filed on Apr. 5, 2022.

(51) Int. Cl.
*G06Q 10/0639* (2023.01)

(52) U.S. Cl.
CPC .............................. *G06Q 10/06398* (2013.01)

(58) Field of Classification Search
None
See application file for complete search history.

(56) References Cited

U.S. PATENT DOCUMENTS 7,958,457 B1 * 6/2011 Brandenberg ........ G06F 1/1664 715/811
10,120,746 B1 11/2018 Mehr
10,523,693 B2 * 12/2019 Medvedovsky .... H04L 63/1458
2014/0029038 A1 * 1/2014 Bovenzi ................. G06Q 10/06 358/1.14
2017/0353516 A1 * 12/2017 Gordon ................... H04L 69/40
2018/0248903 A1 * 8/2018 Villella .................. G06N 3/047
(Continued)

FOREIGN PATENT DOCUMENTS

WO WO-2020172701 A1 * 9/2020 ........... G06Q 30/015
WO WO-2022178174 A1 * 8/2022 ............. G06Q 10/20

OTHER PUBLICATIONS

Wani, Deepa, Manoj Malhotra, and Jonathan Clark. "Strategic Service Design Attributes, Customer Experience, and Co-Created Service Choice: Evidence from Florida Hospitals." Production and Operations Management 30.1 (2021): 210-234. (Year: 2021).*
(Continued)

*Primary Examiner* — Thomas L Mansfield

(57) ABSTRACT

A method of a device-level management based on a digital experience includes developing a calculated device index (CDI) expression for a managed device of a managed network. The CDI expression includes a combination of weighted, normalized attribute values. The attributes reflect a digital experience metric of a user relative to the device. The method includes determining a normal device index range (NDIR) that defines values of a CDI indicative of normal operation of the device. The method includes monitoring current attribute data representative of multiple attributes associated with the device. Based on the current attribute data, the method includes computing the CDI using the CDI expression and evaluating the computed CDI relative to the NDIR. Responsive to the CDI being outside the NDIR, the method includes identifying a first attribute that is in an anomalous condition and that contributed to the CDI and implementing an action to mitigate the condition.

14 Claims, 16 Drawing Sheets

(56) References Cited

U.S. PATENT DOCUMENTS

| | | | | |
|---|---|---|---|---|
| 2019/0325532 | A1* | 10/2019 | Torrenegra | G06Q 10/1053 |
| 2021/0168042 | A1 | 6/2021 | Mijumbi et al. | |
| 2022/0084107 | A1* | 3/2022 | Geerdink | G06Q 30/02 |

OTHER PUBLICATIONS

Choi, Cheol-Rim, and Hwa-Young Jeong. "Quality evaluation and best service choice for cloud computing based on user preference and weights of attributes using the analytic network process." Electronic Commerce Research 14 (2014): 245-270. (Year: 2014).*

Khan, Nusratullah, et al. "Calculating customer experience management index for telecommunication service using genetic algorithm based weighted attributes." 2018 IEEE International Conference on Innovative Research and Development (ICIRD). IEEE , 2018. (Year: 2018).*

International Search Report and Written Opinion for Application No. PCT/US2023/065339, dated Jul. 20, 2023, 10 pages.

International Preliminary Report on Patentability and Written Opinion for Application No. PCT/US2023/065339, dated Oct. 8, 2024, 8 pages.

Examination Report for Indian Patent No. 202417084608, dated May 19, 2026, 10 pages.

* cited by examiner

DIGITAL EMPLOYEE EXPERIENCE INDEX

CROSS-REFERENCE TO RELATED APPLICATION

This application claims the benefit of and priority to U.S. provisional application No. 63/327,594, filed Apr. 5, 2022, which is incorporated herein by reference in its entirety.

FIELD

The embodiments described in this disclosure are related to managed device management. In particular, some embodiments are related to systems and methods for quantifying a digital employee experience index that is representative of a device-level or user-level experience in a managed network.

BACKGROUND

In enterprise and other managed networks, a managed device refers to a computing device that may be integrated into the network and that is in communication with a management device. The management device may include a server device, for instance, which has visibility to operating parameters and state parameters of the managed devices. Based on information communicated between the management device and the managed devices, the management device may detect issues at the managed devices, deploy solutions to the managed devices, update software on the managed devices, troubleshoot issues at the managed devices, provision roles and security controls to the managed devices, etc. The visibility into the operating parameter and state parameters of the managed devices may be involved in other management operations. For instance, an attempt to identify a cause of a technical issue on the managed devices or making an evaluation of suitability of a software application may be based on the management device accessing parameters from the managed device.

Some conventional managed networks implement end user experience management (EUEM) systems or digital experience management (DEX) systems. DEX systems and EUEM systems are directed toward assessing an experience of the end users, determining engagement and performance, and, when possible, improve the experience. The DEX systems and EUEM systems may combine and process analytical data, employee sentiment data, information technology (IT) remediation data, etc. to make the assessments and suggest or implement improvements.

The conventional DEX and EUEM systems are limited by sources of information, ongoing availability of data from these sources, and ability of the DEX and EUEM systems to update, adapt, and modify parameters used in measuring experience of the user based on current data. Accordingly, a need exists to improve end-user experience management systems.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment may include a method of a device-level evaluation of a digital experience. The method may include developing a calculated device index (CDI) expression. The CDI expression may be developed for a managed device included in a managed network. The CDI expression may include a combination of weighted, normalized attribute values. The method may include determining a normal device index range (NDIR). The NDIR may define one or more values of a CDI that are indicative of normal operation of the managed device. During operation of the managed device, the method may include monitoring current attribute data. The current attribute data is representative of multiple attributes associated with the managed device. The attributes reflect a digital experience metric of a user relative to the managed device. Based on the current attribute data, the method may include computing the CDI based on the CDI expression. The method may include evaluating the computed CDI relative to the NDIR. Responsive to the CDI being outside the NDIR, the method may include identifying a first attribute that is in an anomalous state and that contributed to the CDI. The method may include implementing a corrective action to mitigate an anomalous condition. Responsive to the CDI being within the NDIR, the method may include identifying whether operational or network data is indicative of anomalous operation of the managed device. Responsive to the operational or network data being indicative of anomalous operation, the method may include storing information related to the managed device during the period in which the CDI is within the NDIR and the managed device is in a state of anomalous operation. The method may include assessing one or more weights of the CDI expression and modifying at least one of the weights. Additionally, responsive to the operational or network data not being indicative of anomalous operation, the method may include continuing to monitor the current attribute data, assessing computed CDIs relative to the NDIR, modifying weights, etc.

An additional aspect of an embodiment includes a non-transitory computer-readable medium having encoded therein programming code executable by one or more processors to perform or control performance at least a portion of the method described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The embodiments described in this disclosure are related to managed device management. In particular, some embodiments are related to systems and methods for quantifying a digital employee experience index that is representative of a device-level or user-level experience in a managed network.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
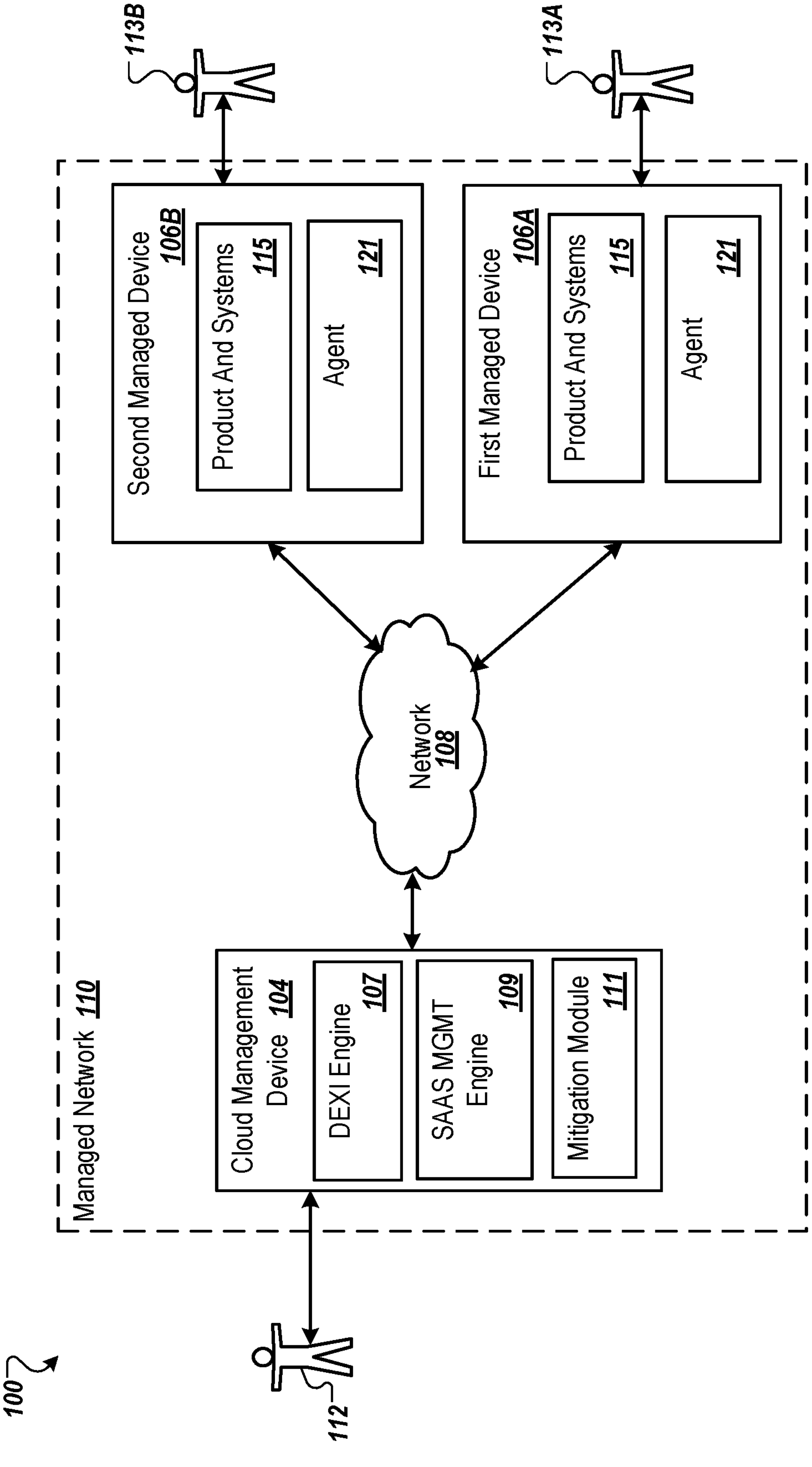
FIG. 1 depicts a block diagram of an example operating environment in which some embodiments described in the present disclosure may be implemented.

FIG. 1 depicts an example operating environment 100 in which some embodiments may be implemented. The operating environment 100 may include a cloud management device 104 communicatively coupled to one or more managed devices 106A and 106B (generally, managed devices 106). The cloud management device 104 may be configured to analyze the digital employee experience index (DEXI) of users 113A and 113B and to actively improve analysis tools implemented for this function. The DEXI may be determined at a device-level and at a user-level. Accordingly, an analytical tool implemented to determine the DEXI for a first user 113A and/or a first managed device 106A may be different from an analytical tool implemented to determine the DEXI for a second user 113B and/or a second managed device 106B. Moreover, as one or both of the managed devices 106A and 106B continue to operate, the cloud management device 104 adapts and alters the analytical tools. In addition to determination of the DEXI, the cloud management device 104 may be configured to implement corrective action based on the DEXI. For instance, the cloud management device 104 may include a mitigation module 111. The mitigation module 111 may automate corrective actions directed to the first managed device 106A or the second managed device 106B (generally, managed device 106 or managed devices 106). Additionally or alternatively, the mitigation module may generate recommendations, communications, and inquiries directed to the first user 113A or the second user 113B (generally, user 113 or users 113). The cloud management device 104 monitors responses and corrective actions and further adapts the analytical tools based thereon.

The cloud management device 104 operates within a managed network 110 that includes the managed devices 106. As part of the managed network 110, the cloud management device 104 includes a SAAS management engine (in the Figures "SAAS MGMT engine") 109 that performs one or more management operations relative to the managed devices 106. For instance, the SAAS management engine 109 may ensure the managed devices 106 are up to date, may ensure users 113 of the managed devices 106 have access to products and systems 115 (hereinafter, "products 115") suitable for a role or function, the SAAS management engine 109 may provide technical support to the managed devices 106, and the like. Associated with these management operations are data that represent attributes of the managed devices 106 in substantially (e.g., with material delay) real time or real time. The attributes each reflect a digital experience metric of the user 113 relative to the managed device 106. The attributes might include operating parameters of the managed devices 106, network parameters of the managed network 110, acute event parameters, product 115 parameters, other parameters indicative of or that might contribute to DEXI, and the like. For instance, in some embodiments, the attributes of the managed devices 106 may include device attributes, security attributes, service management attributes, and application attributes. Some additional details of the attributes are provided elsewhere in the current disclosure.

The cloud management device 104 includes a DEXI engine 107 that calculates the DEXI of each managed device 106 using attribute data. Moreover, as the users 113 operate the managed devices 106 and as issues arise in the managed network 110 the DEXI engine 107 adapts and refines analytical tools used to calculate the DEXI. In some embodiments, the DEXI engine 107 enables a holistic view of the experience of the users 113 instead of assessing satisfaction related to one set or group of attributes.

The cloud management device 104 of FIG. 1 addresses limitations in conventional systems that measure employee's digital experience. For instance, in some of these conventional systems, the digital experience might be based on post-ticket surveys. These systems are limited to reactions to acute technical events and feedback from users following resolution of the acute technical event. The users and devices in these conventional systems suffer from languishing technical issues and the view of the experience is only based on times during which an acute technical event occurs. Similarly, some conventional systems fail to consider device parameters or application parameters. These conventional systems cannot monitor technical operation of the devices. Thus, latent device issues go unseen until device inoperability results. Additionally, conventional experience assessment systems are static. For instance, these conventional systems implement a fixed set of criteria to describe an "event." The set of criteria is broadly applied (e.g., across a device type or user role). When data is captured that meet the set of criteria, the conventional system logs an event. These conventional systems fail to adapt experience metrics and present experience at a high level of granularity.

The DEXI engine 107 solves these and other limitations of conventional systems and improves experience assessment. For instance, the DEXI engine 107 calculates the DEXI based on attribute data from the SAAS management engine 109 as well as attribute data pulled directly from the managed devices 106. Moreover, as described elsewhere herein, the DEXI is computed based on a calculated device index (CDI) expression. The CDI expression is developed and adapted at the device-level and/or user-level. Because the DEXI is calculated based on the broader types of attribute data, which may be based on different domains, and the device-level of granularity, the DEXI represents an employee experience assessment based on device, application, security, and service attributes. Additionally, the DEXI represents an automated issue identification and diagnosis operation as well as an initiation point for automated mitigation.

In the embodiment of FIG. 1, the operating environment 100 may include the managed devices 106, and the cloud management device 104 that communicate via a network 108. The network 108 is configured to communicate data and information between the managed devices 106 and the cloud management device 104.

The network 108 may include any communication network configured for communication of signals between the components (e.g., 104 and 106) of the operating environment 100. The network 108 may be wired or wireless. The network 108 may have configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

Additionally, in the embodiment of FIG. 1, the managed devices 106 and the cloud management device 104 are included in the managed network 110. The managed network 110 is implemented to enable management of the managed devices 106 by the cloud management device 104. To implement the managed network 110, the managed devices 106 may be enrolled. After the managed devices 106 are enrolled, ongoing management of the managed devices 106 may be implemented by the cloud management device 104. The ongoing management may include overseeing and dictating at least a part of the operations at the managed devices 106 as described in the present disclosure. The managed network 110 may be associated with an enterprise, a portion of an enterprise, a government entity, or another entity or set of devices (e.g., 104 and 106).

The managed devices 106 may include hardware-based computer systems that are configured to communicate with the other components of the operating environment 100 via the network 108. The managed devices 106 may include any computer device that may be managed by the cloud management device 104 and/or have been enrolled in a managed network 110. Generally, the managed devices 106 include devices that are operated by the personnel and systems of an enterprise or store data of the enterprise. The managed devices 106 might include workstations of an enterprise, servers, data storage systems, printers, telephones, internet of things (IOT) devices, smart watches, sensors, automobiles, battery charging devices, scanner devices, etc. The managed devices 106 may also include virtual machines, which may include a portion of a single processing unit or one or more portions of multiple processing units, which may be included in multiple machines.

The managed devices 106 include the products 115. The products 115 may include applications, components, systems, drivers, of any kind or type. Some examples of the products 115 may include software applications, enterprise software, operating systems, hardware components, installed printers, memory locations, utilized monitors, ports, plug-ins, services, network communication components, the managed device 106 itself (or information related thereto), similar computer-related features or components, or combinations thereof. The products 115 may differ between the managed devices 106. For instance, the first managed device 106A might have a processor with different capacity than the processor of the second managed device 106B.

The managed devices 106 might also include an agent 121. In some embodiments, the SAAS management engine 109 may interface with the agent 121. For instance, the agent 121 may have a high level of privilege on the managed device 106, which enables visibility of the agent 121 to the products 115 as well as operational parameters related to or characterizing the products 115. The agent 121 may be configured to exist on the managed devices 106 to support ongoing management of the managed devices 106. The agent 121 may interface with local applications (e.g., the search feature) at the agent 121 and may support communication of information back to the cloud management device 104. In some embodiments, the DEXI engine 107 may be configured to interface directly with the agent 121. In some embodiments, the DEXI engine 107 might interface indirectly with the agent 121 via the SAAS management engine 109.

The managed devices 106 may be associated with the users 113. The phrase "associated with" when describing the relationship between the managed devices 106 and the users 113 indicates that the users 113 generally or regularly operate the managed devices 106. Because of this association, references to communication of a message or inquiry to the user 113 may indicate that the inquiry is communicated to the managed device 106 associated with the user 113.

Similarly, a response by one of the users 113 may indicate that the user 113 provided user input to the managed device 106, which is communicated to the cloud management device 104.

The cloud management device 104 may include a hardware-based computer system that is configured to communicate with the other components of the operating environment 100 via the network 108. In some embodiments, the cloud management device 104 may be a single server, a set of servers, a virtual device, or a virtual server in a cloud-based network of servers. In these and other embodiments, the DEXI engine 107 may be spread over two or more cores, which may be virtualized across multiple physical machines.

The cloud management device 104 may be associated with an administrator 112. The administrator 112 may be an individual, a set of individuals, or a system that interfaces with the cloud management device 104. In some embodiments, the administrator 112 may provide input to the cloud management device 104. The input provided by the administrator 112 may form the basis of some computing processes and operations performed by the cloud management device 104. For example, the administrator 112 may provide user input at a user interface associated with the cloud management device 104.

The cloud management device 104 includes the DEXI engine 107. The DEXI engine 107 may be configured to develop multiple CDI expressions, which are used to compute a DEXI for the managed devices 106. The CDI expressions may include a combination of weighted, normalized attribute values that are based on attribute data from the managed devices 106, the SAAS management engine 109, the agent 121, other sources or domains, or combinations thereof.

For instance, in some embodiments, the attribute data may be communicated by the SAAS management engine 109 and from the agent 121. The DEXI engine 107 may then develop the CDI expression from the attribute data. Additionally or alternatively, the DEXI engine 107 may interact with one or more components of the SAAS management engine 109 or a cloud platform implementing the SAAS management engine 109 to access the attribute data.

In general, the CDI expressions are not static or fixed expressions. Instead, the CDI expressions are developed based on attribute data that is either historical or during an initial period of operation of the managed devices. The CDI expressions are based on evaluation of interactions between the attributes relative to one another as well as interactions between the attributes and operational data. To develop the CDI expression, the DEXI engine 107 identifies attribute contributions during normal operation and during anomalous operation of the managed devices. The attribute contributions are the extent to which each attribute contributes to the anomalous operation or to the normal operation. As used in the present disclosure, the term "normal operation" and variations thereof indicate the managed device 106 is in a condition in which components of the managed device 106 function within standard and recommended operational parameter ranges. Additionally, the term "anomalous operation" and variations thereof indicate that at least one component of the managed device 106 is operating outside the standard and recommended operational parameter ranges.

The DEXI engine 107 assigns weights to the attributes that reflect the attribute contribution of the attribute to which the weight is assigned. The CDI expressions may be used to compute CDI of the managed devices 106 based on current attribute data that are normalized and weighted.

The DEXI engine 107 may determine a normal device index range (NDIR). The NDIR defines values of a CDI that are indicative of normal operation of the managed device. In some embodiments, the NDIR may be defined between a maximum CDI and a minimum CDI. In other embodiments, the NDIR may include two or more CDI values where actions are initiated or performed. For instance, if the CDI drops below 90 (e.g., 90 out of 100), then a communication or inquiry may be communicated to the user 113. If the CDI drops below 50 (e.g., 50 out of 100), then an automated corrective action may be implemented.

During operation of the managed devices, the DEXI engine 107 may monitor current attribute data representative of the attributes associated with the managed devices 106. Based on the current attribute data, the DEXI engine 107 may compute the CDI based on the CDI expression and current attribute data. The DEXI engine 107 may cause display of data representative of the CDI in a user interface of the cloud management device 104 such that the administrator 112 may view the CDI. The CDI may be computed periodically or responsive to events in some embodiments. For instance, the CDI may be computed daily, hourly, following an incident report, following modifications to a system implementing the DEXI engine 107, etc.

The DEXI engine 107 may evaluate the computed CDI relative to the NDIR. In some embodiments, the DEXI engine 107 may determine whether the CDI is outside the NDIR, which might indicate that the managed device 106 is in an anomalous operating state. The DEXI engine 107 may identify a first attribute that is in an anomalous state and that contributed to the CDI. The DEXI engine 107 may then communicate with the mitigation module 111 to implement a corrective action to mitigate an anomalous condition. Additionally or alternatively, the DEXI engine 107 may determine where the CDI falls within the NDIR and implement an action based thereon.

Implementation of the corrective action might include identifying a component of the managed device 106 or of the managed network 110 that affects the first attribute. Additionally, implementing an action on the component may modify a state of the component such that the CDI is different such as modification of the state of the components such that the computed CDI is within the NDIR.

Additionally still, the implementing the corrective action might include communicating an inquiry to one of the users 113. The inquiry may describe the anomalous state. The inquiry may also provide a user-implemented solution or request authorization to implement an automated corrective action. The DEXI engine 107 may receive a response to the inquiry from the user 113.

The DEXI engine 107 modifies the CDI expressions responsive to the operation of the managed devices 106. For instance, the DEXI engine 107 may modify at least one of the weights of the CDI expression. The modification of the weights may be implemented responsive to inconsistencies between an operational state of the managed devices 106, attribute data during periods of the inconsistencies, current attribute data, historical CDI of the managed devices 106, inquiry responses from the user 113, evaluation of the managed devices 106 based on the CDI and NDIR, or combinations thereof.

For example, in some embodiments, comparison between CDI and NDIR may indicate that the managed device 106 is in an anomalous state. In response, the DEXI engine 107 may communicate with the user 113. A response from the user 113 may indicate that the managed device 106 is not in an anomalous state. The response might indicate that the CDI expression is not accurately assessing normal and anomalous operations of the managed device 106. The response from the user 113, attribute data during the anomalous state, and the CDI may be stored for evaluation.

Similarly, responsive to the CDI being within the NDIR, the DEXI engine 107 may identify whether operational or network data is indicative of anomalous operation of the managed device 106. However, there might be a ticket (or other incident data) pending in the SAAS management engine 109. Again, in these circumstances, the CDI expression may not be accurately assessing normal and anomalous operations of the managed device 106. The ticket, attribute data during the normal state, and the CDI may be stored for evaluation.

After multiple CDIs (e.g., fifty to one-hundred CDIs) are stored and data from multiple periods of inconsistency and consistency are stored, the DEXI engine 107 may modify the CDI expressions. For instance, the DEXI engine 107 may assess weights of the CDI expression and modify at least one of the weights. When the CDI is consistent with responses from the user 113 and other operational or network data, the DEXI engine 107 may continue to monitor the current attribute data and provide data indicative of the CDI to the administrator.

The DEXI engine 107, the SAAS management engine 109, the mitigation module 111, at least some of the products 115, the agent 121, combinations thereof, and components thereof may be implemented using hardware including a processor, a microprocessor (e.g., to perform or control performance of one or more operations), a field-programmable gate array (FPGA), or an application-specific integrated circuit (ASIC). In some other instances, DEXI engine 107, the SAAS management engine 109, the mitigation module 111, at least some of the products 115, the agent 121, combinations thereof, and components thereof may be implemented using a combination of hardware and software. Implementation in software may include rapid activation and deactivation of one or more transistors or transistor elements such as may be included in hardware of a computing system (e.g., the managed devices 106 or the cloud management device 104 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more cloud management devices 104, one or more managed devices 106, or any combination thereof. Moreover, the separation of various components and devices in the embodiments described herein is not meant to indicate that the separation occurs in all embodiments. Moreover, it may be understood with the benefit of this disclosure that the described components and servers may be integrated together into a single component or server or separated into multiple components or servers.

FIGS. 2A-2D depict block diagrams of an example management process utilizing DEXI that may be implemented in the operating environment of FIG. 1 or another suitable environment. The management process utilizing DEXI of FIGS. 2A-2D may include one or more components (104, 106, 107, 109, and 111) described with reference to FIG. 1. Although not depicted in FIGS. 2A-2D, communication in the management process utilizing DEXI may be via a network such as the network 108 of FIG. 1.

Figure 2A:
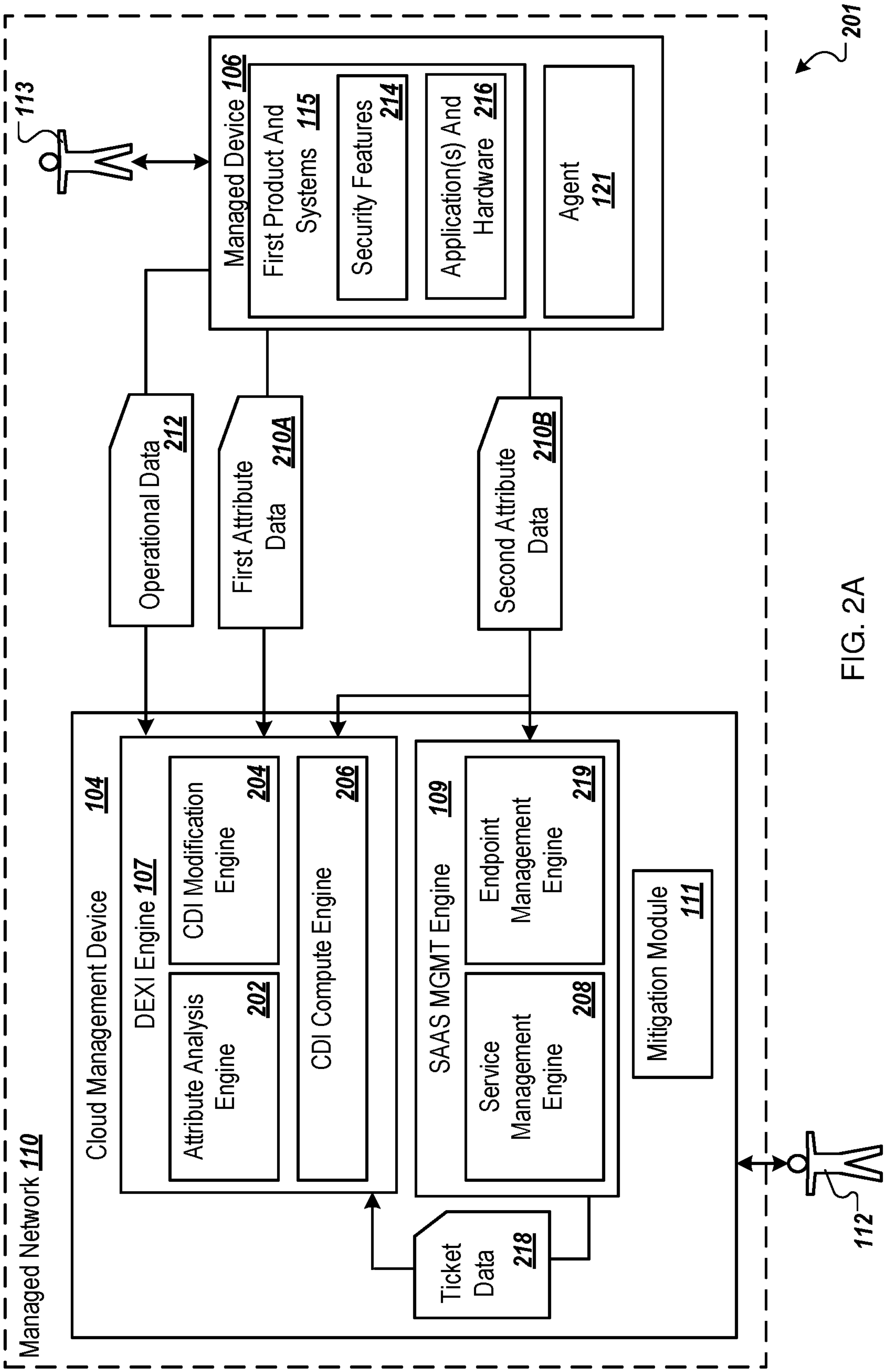
FIG. 2A illustrates a block diagram of an example data access process that may be implemented in the operating environment of FIG. 1.
Figure 2B:
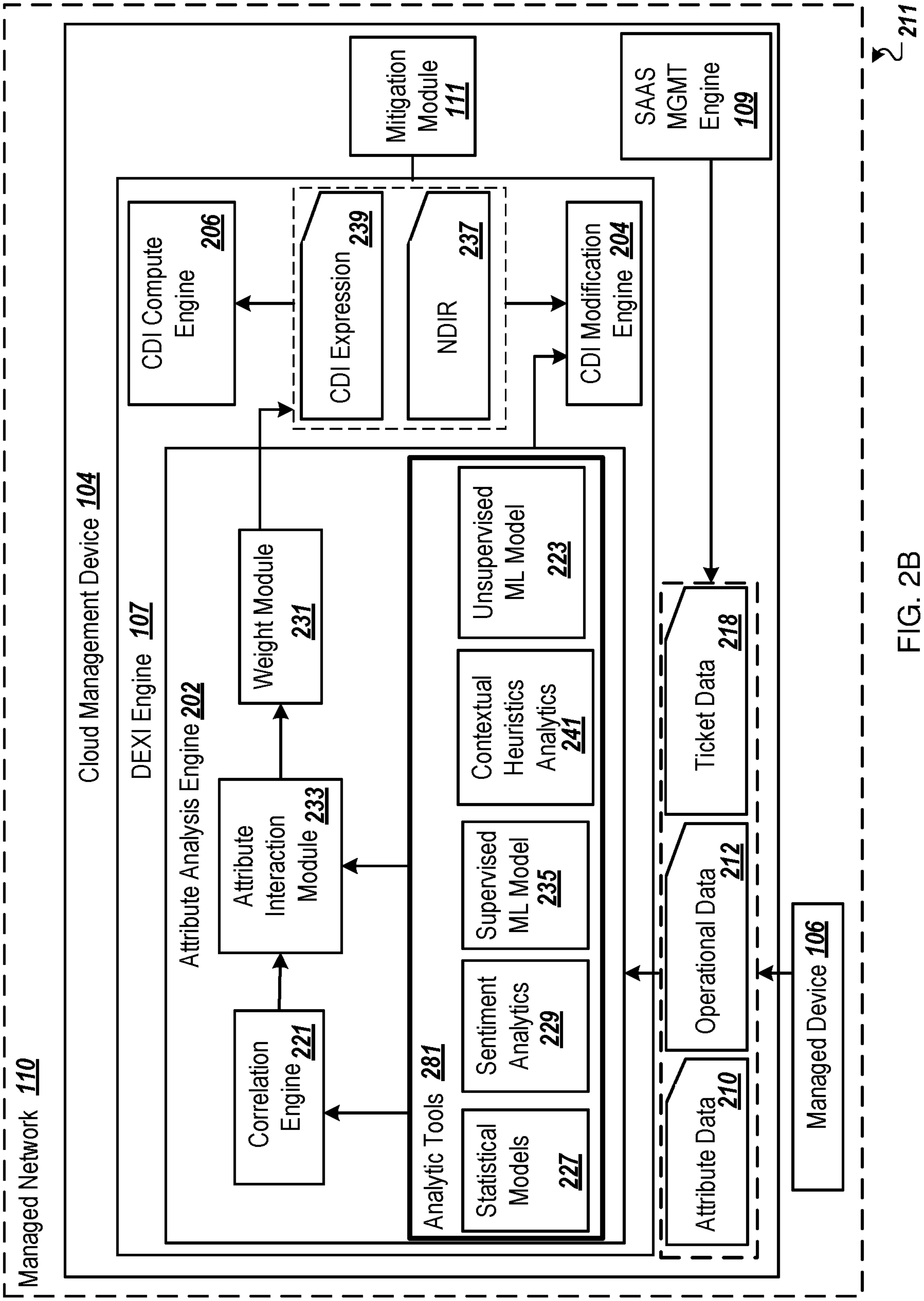
FIG. 2B illustrates a block diagram of an example attribute analysis process that may be implemented in the operating environment of FIG. 1.
Figure 2C:
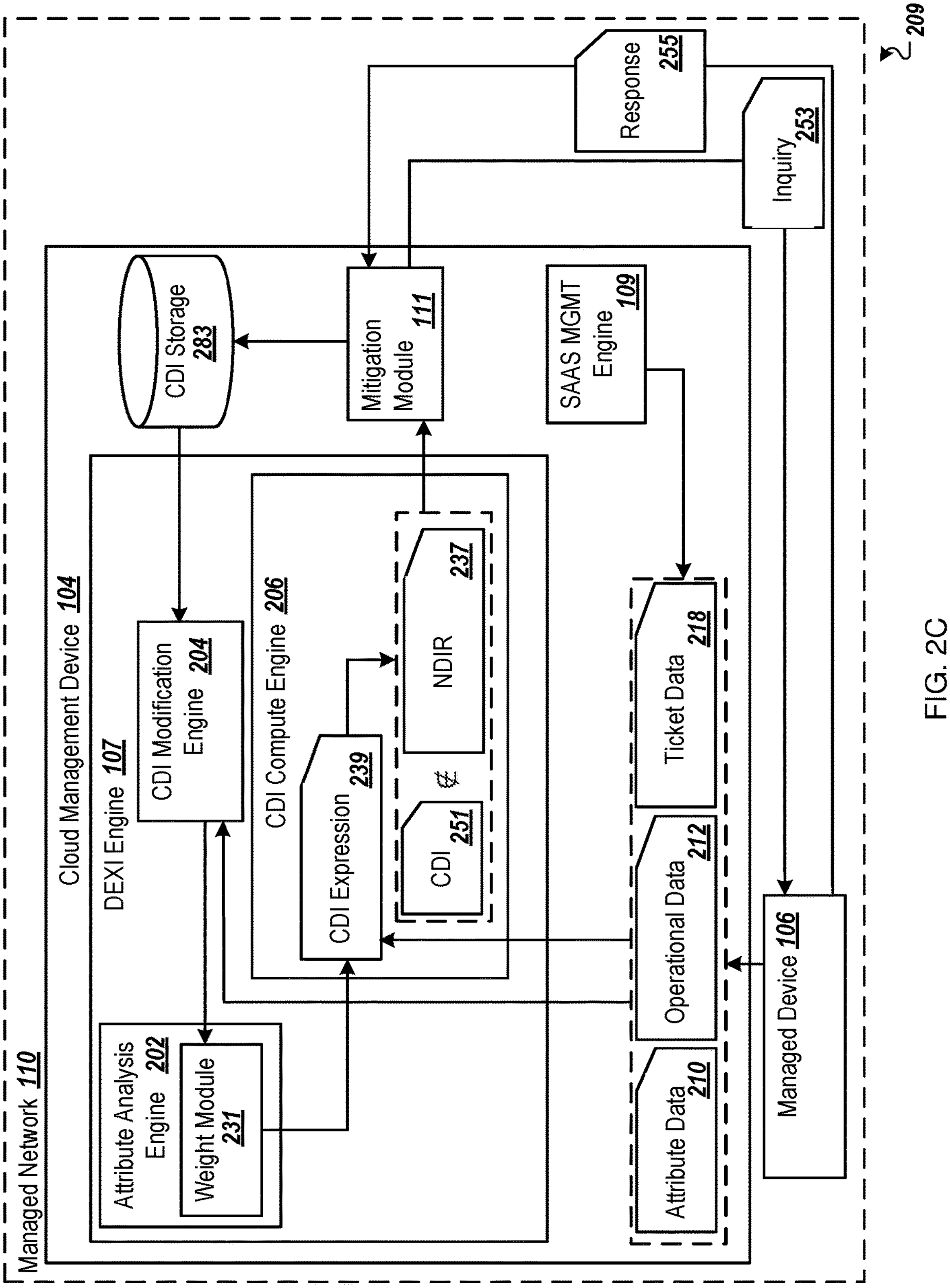
FIG. 2C illustrates a block diagram of an example mitigation process that may be implemented in the operating environment of FIG. 1.
Figure 2D:
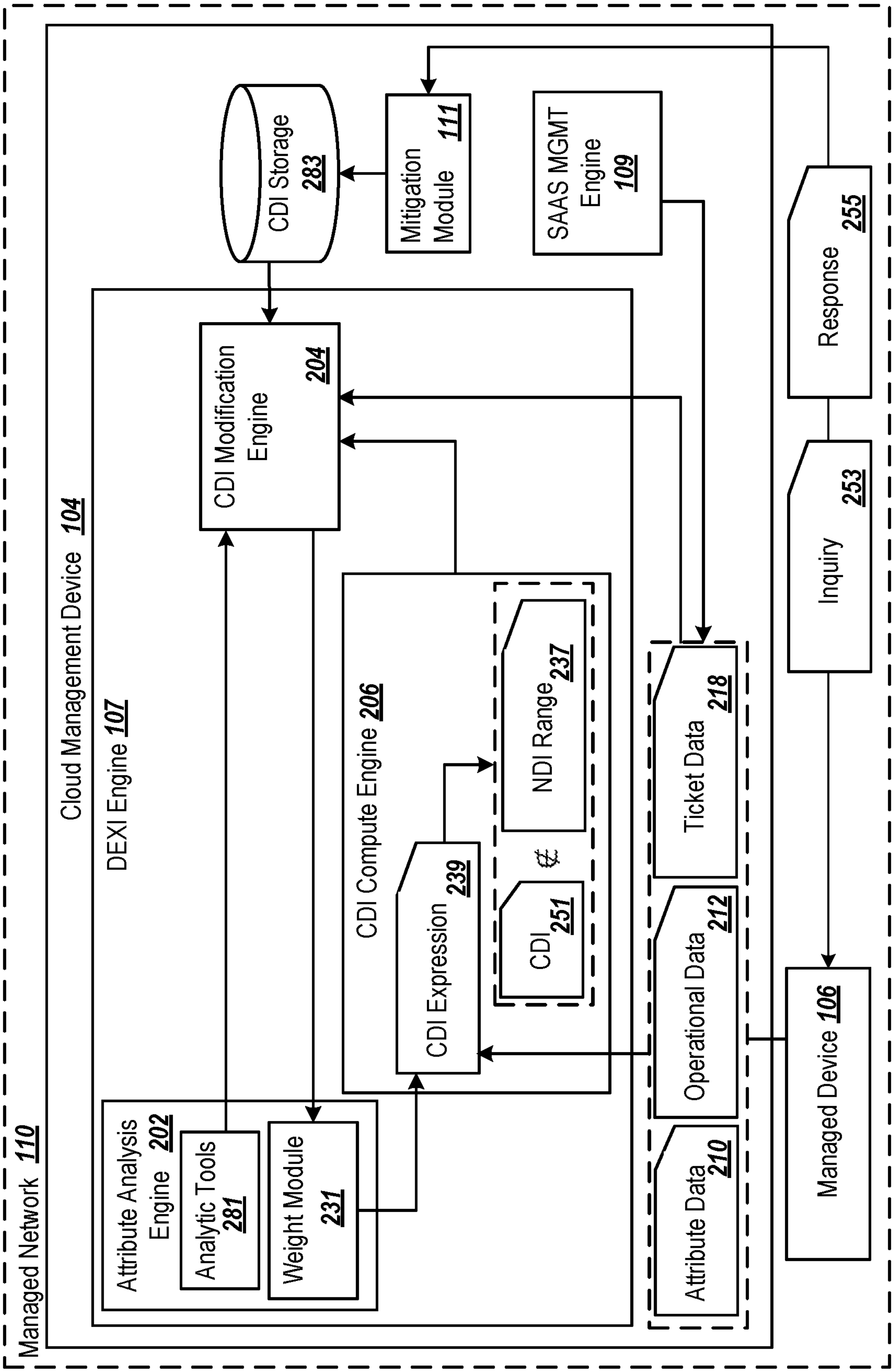
FIG. 2D illustrates a block diagram of an example weight modification process that may be implemented in the operating environment of FIG. 1.

Each of FIGS. 2A-2D illustrates a sub-process of the management process utilizing DEXI. FIG. 2A illustrates a block diagram of an example data access process (access process) 201. FIG. 2B illustrates a block diagram of an example attribute analysis process (analysis process) 211. FIG. 2C illustrates a block diagram of an example mitigation process (mitigation process) 209. FIG. 2D illustrates a block diagram of an example weight modification process (modification process) 207. Each of the sub-processes is described separately.

FIG. 2A illustrates a block diagram of the access process 201 according to some embodiments of the present disclosure. The access process 201 involves operations implemented to gather or access multiple types of data (e.g., 210A, 210B, 218, and 212). The data is accessed or gathered by the DEXI engine 107 and used to generate a CDI expression, compute the CDI of the managed device 106, and modify the CDI.

The access process 201 may be an ongoing process in the managed network 110. The embodiment of FIG. 2A describes an embodiment of the access process 201 implemented in a cloud-based network in which SAAS management operations occur. For instance, in the managed network 110, the cloud management device 104 includes the SAAS management engine 109 with a service management engine 208 and an endpoint management engine 219. The service management engine 208 is configured to provide help desk solutions, ticketing solutions for the managed device 106, management of automated IT solutions, analytics related thereto, and other suitable services. The endpoint management engine 219 provides endpoint management services such as patch management, application control, resource management, asset management, policy management, license management, etc.

The data used by the DEXI engine 107 may include multiple types of data and may originate at multiple domains. For example, in the depicted embodiment, the DEXI engine 107 may access operational data 212, first attribute data 210A, second attribute data 210B, and ticket data 218 (collectively, data 210, 212, 218). The operational data 212 may include data that enables identification of the normal operation of the managed device 106 or a normal or acceptable standard for an attribute. For instance, the operational data 212 might include standards related to applications and hardware 216 of the managed device 106, information related to security features 214 of the managed device 106, etc. The ticket data 218 may represent information related to a service management engine 208. The ticket data 218 may identify an acute event or technical issue at the managed device 106, metrics (e.g., time to resolution, escalation of tickets, interactions with the user 113, etc.) related to tickets, incident data, and the like. The first and second attribute data 210A and 210B (generally, attribute data 210) provide a value of a parameter of the managed device 106, the managed network 110, the applications and hardware 216, or some combination thereof.

The attribute data 210 may be communicated from the managed device 106, the agent 121, an endpoint management engine 219, or some combination thereof. For instance, in the depicted embodiment, the endpoint management engine 219 may be implemented with the agent 121 to implement endpoint management services. The attribute data 210 related to the endpoint management services may be communicated to the DEXI engine 107 directly or via the endpoint management engine 219.

Similarly, the service management engine 208 may be configured to provide IT support to the managed device 106.

The ticket data 218 may be communicated to the DEXI engine 107 from the service management engine 208 or a user interface of the managed device 106 configured to interface with the service management engine 208 may also communicate the ticket data 218 to the DEXI engine 107.

The DEXI engine 107 includes an attribute analysis engine 202, a CDI compute engine 206, and a CDI modification engine 204. The data 210, 212, and 218 may be communicated to one or more of the attribute analysis engine 202, the CDI compute engine 206, and the CDI modification engine 204. For instance, the data 210, 212, and 218 may be communicated to the attribute analysis engine 202 to develop a CDI expression for the managed device 106 and the user 113. In some embodiments the data 210, 212, and 218 may be historical data or may be from a time prior to active management using the DEXI. Additionally or alternatively, the data 210, 212, and 218 may be from a similar managed device (e.g., having a similar type, configuration, products 115, role in an enterprise, etc.). The attribute analysis engine 202 may develop the CDI expression and communicate a developed CDI expression to the CDI compute engine 206.

The CDI compute engine 206 may receive the data 210, 212, and 218 or some portion thereof to compute a CDI. The CDI compute engine 206 may receive current data 210, 212, 218, which may be provided via an ongoing monitoring operation implemented by the cloud management device 104. The term "current" indicates the data 210, 212, 218 stems from operations following an initial development of the CDI expression and during operation of the managed device 106. The CDI compute engine 206 computes a CDI based on the current data 210, 212, 218.

The CDI modification engine 204 may receive the data 210, 212, and 218 or some portion thereof. The CDI modification engine 204 uses the data 210, 212, and 218 to make modifications to weights of the CDI expressions.

In some embodiments, the attributes include two or more subsets of attributes that originate from two or more separate domains. For instance, the attributes may include a first subset of attributes that originates from a first domain, a second subset of attributes that originates from a second domain, a third subset of attributes that originates from a third domain, a fourth subset of attributes that originates from a fourth domain, etc. In the depicted embodiment of FIGS. 2A-2D, there are four subsets of attributes. The first subset of attributes may include device attributes that include operational data from the managed device 106. In detail, the device attributes may relate to the operation of the managed device 106 itself. For instance, the first subset of attributes may include device age, battery status, central processing unit (CPU) usage, memory usage, storage usage, an operating system (OS) update, an OS install date, a boot degradation, a user profile or a portion of the user profile, a system failure indication, a blue screen error notification, other device parameters, or combinations thereof.

The second subset of attributes includes security attributes and security data. The second domain of the security attributes may be a security management system associated with the managed device 106 and may relate to the security features 214 of the managed device 106. For instance, the second subset of attributes includes antivirus status, firewall status, spyware status, data protection indicators, password strength, patch status, user access control status, risk-based vulnerability assessment, other security parameters, or combinations thereof.

The third subset of attributes includes service management attributes. The third domain includes data from the service management engine 208. The third subset of attributes includes an incident report, a description and subject of an incident report or ticket, a priority or urgency of an incident report, a mean time to resolve (MTTR), a current status of an incident, a first call resolution, an escalation of an incident, an inquiry or inquiry response, other service management parameters, or combinations thereof.

The fourth subset of attributes may include application attributes. The fourth domain includes data from the endpoint management engine 219 that implements an application management system. The fourth subset of attributes may include an application error, a license status of an application, cloud service usage, a cloud service outage, service mapping, application telemetry, application usage indicative of user frustration, an application log, a digital signature of an application, an application scan, survey bot inquiries and responses, information from bots scheduled to logon to application, other application parameters, or combinations thereof.

The subsets of attributes enable evaluation of an employee's experience based on one or more of the subsets. For instance, the attributes related to one subset may be problematic, which may focus efforts of a mitigation to systems related to those attributes. In other embodiments more than four or fewer than four subsets may be used.

FIG. 2B illustrates a block diagram of the analysis process 211 according to at least one embodiment of the present disclosure. As introduced above, the data 210, 212, and 218 are accessed by the attribute analysis engine 202 of the DEXI engine 107. The attribute analysis engine 202 may include a correlation engine 221, an attribute interaction module 233, a weight module 231, and analytic tools 281.

The correlation engine 221 is configured to correlate the data 210, 212, 218, or some combinations thereof. The correlation engine 221 may implement two or more of the analytic tools 281 to generate the CDI expression 239. For instance, in the depicted embodiment the correlation engine 221 may implement an unsupervised machine learning (ML) model 223, sentiment analytics 229, contextual heuristics analytics 241, statistical models 227, or combinations thereof. In some embodiments, the correlation engine 221 may process the data 210, 212, 218 using the contextual heuristics analytics 241 to scale the data 210, 212, 218 based on domain knowledge (e.g., managed device 106 characteristics, user 113 roles, types of enterprise, etc.) or empirical evidence. Similarly, the correlation engine 221 may implement sentiment analytics 229 on the ticket data 218 to gauge sentiment of employees. The sentiment analytics 229 may be pre-trained in some instances to assess whether a user (e.g., the user 113) is frustrated or not, a level of sophistication, etc. Application of the sentiment analytics 229 and the contextual heuristics analytics 241 may generate derivative data, which may be used in development of the CDI expression 239 and alterations to the CDI expression 239.

Additionally, the correlation engine 221 is configured to correlate the attributes data 210 to the operational data 212. In some embodiments, the correlation engine 221 may correlate the attributes data 210 to the operational data 212 to identify attribute value ranges during the normal operation and the attribute value ranges during anomalous operation. For instance, the correlation engine 221 may identify the normal operations of the managed device 106. During these periods, values for the attributes may be identified. Thus, the correlation engine 221 may identify acceptable ranges of the attributes during normal operation of the managed device 106. Similarly, the correlation engine 221 may analyze anomalous operation of the managed device

106. During a period in which the managed device 106 is inoperable or experiencing an acute technical issue, the correlation engine 221 may identify values for the attributes. Moreover, the correlation engine 221 may analyze the attribute data 210 as the normal operation transitions to the anomalous operation. Accordingly, ranges of values of the attributes during periods of normal operation and anomalous operation may be identified. In some embodiments, the correlation engine 221 may implement an unsupervised ML module 223 to perform the foregoing analysis and in particular to identify deviations from normal operation and anomalous values.

In some embodiments, the correlation engine 221 may analyze data based on a domain from which the attribute data originates. For instance, all data from the managed device 106 may be analyzed together, all data from the SAAS management engine may be analyzed together, etc. The correlation engine 221 may generate domain-specific portions of the CDI expression from the attribute data from each domain.

The correlation engine may normalize attribute value ranges and/or the attributes using statistical models 227. In general, the normalization operation brings each of the attribute value ranges or attributes within a particular, standard range (e.g., a range from 0 to 1, from 0 to 100, etc.). Normalization may enable different attributes or attributes from different domains to be compared.

The attribute interaction module 233 is configured to evaluate interactions between attributes. In general, the attribute interaction module 233 is configured to perform a deep analysis of dependencies between the data 210, 212, and 218 to determine correlations, relationships, etc. between them. The interactions analyzed by the attribute interaction module 233 may be between the attributes relative to one another as well as interactions between the attributes and the operational data 212. The interactions between the attributes may be evaluated to identify attribute contributions to normal operation and anomalous operation of the managed device 106. The attribute contributions are the extent to which each attribute contributes to an anomalous operation or to a normal operation.

For instance, the attribute interaction module 233 reviews which of the attributes are anomalous during periods of anomalous operation of the managed device 106. In some circumstances, one attribute may be anomalous, but may not create an overall anomalous operation. For instance, one application may not be updated, which slows operation or produces an error or ticket, but does not render the managed device inoperable. In contrast, in some circumstances, a single attribute may render the managed device 106 in an inoperable state. For instance, a lack of ink in a printer or a malfunctioning processor might render the managed device 106 inoperable. The attribute interaction module 233 looks at the combinations of the attributes to the state of the managed device 106 and determines which contribute more or less to the overall state.

The attribute interaction module 233 may access and use one or more of the analytic tools 281. In some embodiments, the attribute interaction module 233 may utilize the statistical models 227, the supervised ML module 235, and unsupervised ML model 223 to evaluate the interactions. The attribute interaction module 233 may determine attribute contributions, which are communicated to the weight module 231.

The weight module 231 is configured to assign weights to the normalized attributes of the CDI expression 239. The weight reflects the attribute contribution of the attribute to which the weight is assigned. The weight is a parameter that determines an effect on the overall CDI of an anomalous condition of a particular attribute. For instance, a first attribute (e.g., CPU usage at 100%) may create an anomalous condition of a managed device regardless of other attribute data values. Accordingly, the first attribute may be assigned a relatively high weight. A second attribute (e.g., device age) may not affect the overall state of the managed device. Accordingly, the second attribute may be assigned a relatively lower weight. The weights may be modified during operation of a device-level evaluation of a digital experience as described with reference to FIG. 2D.

The CDI expression 239 includes a combination of weighted, normalized attribute values. Additionally, the CDI expression 239 may be a combination of domain scores as described with reference to FIG. 3.

In some embodiments, the CDI expression 239 may be updated. For instance, a first CDI expression 239 may be generated through analysis of three attributes. The first CDI expression 239 may include a combination of weighted, normalized attribute values for the three attributes. Later, three more attributes may be added to the DEXI engine 107. Accordingly, the attribute analysis engine 202 may repeat the analysis to include the six attributes to produce a second CDI expression. Similarly, the attributes may be added to a domain, which may result in the attribute analysis engine 202 repeating the analysis to produce a second CDI expression. The CDI expression 239 may be communicated to the CDI compute engine 206 and the CDI modification engine 204.

In some embodiments, the CDI expression 239 or some derivative thereof may be used to determine the NDIR 237. For instance, the correlation engine 221 may determine the NDIR 237 for the managed device 106. The NDIR may include a combination of the normalized attribute value ranges during normal operation of the managed device 106. The normalized attribute value ranges may be input to the CDI expression 239 to provide a maximum and minimum CDI for normal operation of the managed device 106. Alternatively, the NDIR 237 may include one or more bands. The one or more bands may be indicative of when a CDI triggers a corrective action. In some embodiments, the identifying the attribute value ranges and the determining the NDIR are performed using a statistical model to standardize values for the NDIR and the attribute value ranges. The NDIR 237 may be communicated to the CDI compute engine 206 and the CDI modification engine 204.

In some embodiments, the NDIR 237 may be applied from a similar managed device. The similar managed device might include a similar device type or role, for instance. The NDIR 237 for the similar managed device may be applied to the managed device 106 at least temporarily. For instance, in response to enrollment of the managed device 106, the NDIR 237 of the similar managed device might be applied.

Additionally, in some embodiments, the NDIR 237 may be specific to the managed device 106 and/or the user 113. For instance, the NDIR 237 may have a first particular range when the user 113 fills a first role at an enterprise and a second particular range when the user fills a second role at the enterprise.

FIG. 2C illustrates a block diagram of an example mitigation process 209 according to at least one embodiment of the present disclosure. The mitigation process 209 includes the CDI compute engine 206 computing a CDI 251 as well as one or more operations performed by the mitigation module 111 to mitigate any issues and modify the CDI expression 239.

In general, the CDI compute engine 206 may compute the CDI 251 based on the data 210, 212, 218. To compute the CDI 251, the current data is input into the CDI expression 239 and to a CDI modification engine 204, which is described elsewhere in the present disclosure. The CDI compute engine 206 evaluates the CDI 251 relative to the NDIR 237. In response to the CDI 251 being outside of the NDIR 237 (e.g., above or below the NDIR 237), the mitigation module 111 may determine that the managed device 106 is in an anomalous state. In response to the managed device 106 being in the anomalous state, the mitigation module 111 may identify a first attribute that is in an anomalous state and/or contributed to the CDI 251. The anomalous state of the first attribute may indicate that the first attribute is outside of an attribute value range for normal operation of the managed device 106. Additionally, the mitigation module 111 may identify a component of the managed device 106 that affects the first attribute. The mitigation module 111 may generate an instruction for a corrective action to mitigate the anomalous condition at the component. In some embodiments, the corrective action includes a modification to change a state of the component. The instruction may be generated such that the computed CDI 251 is within the NDIR 237.

Figure 10:
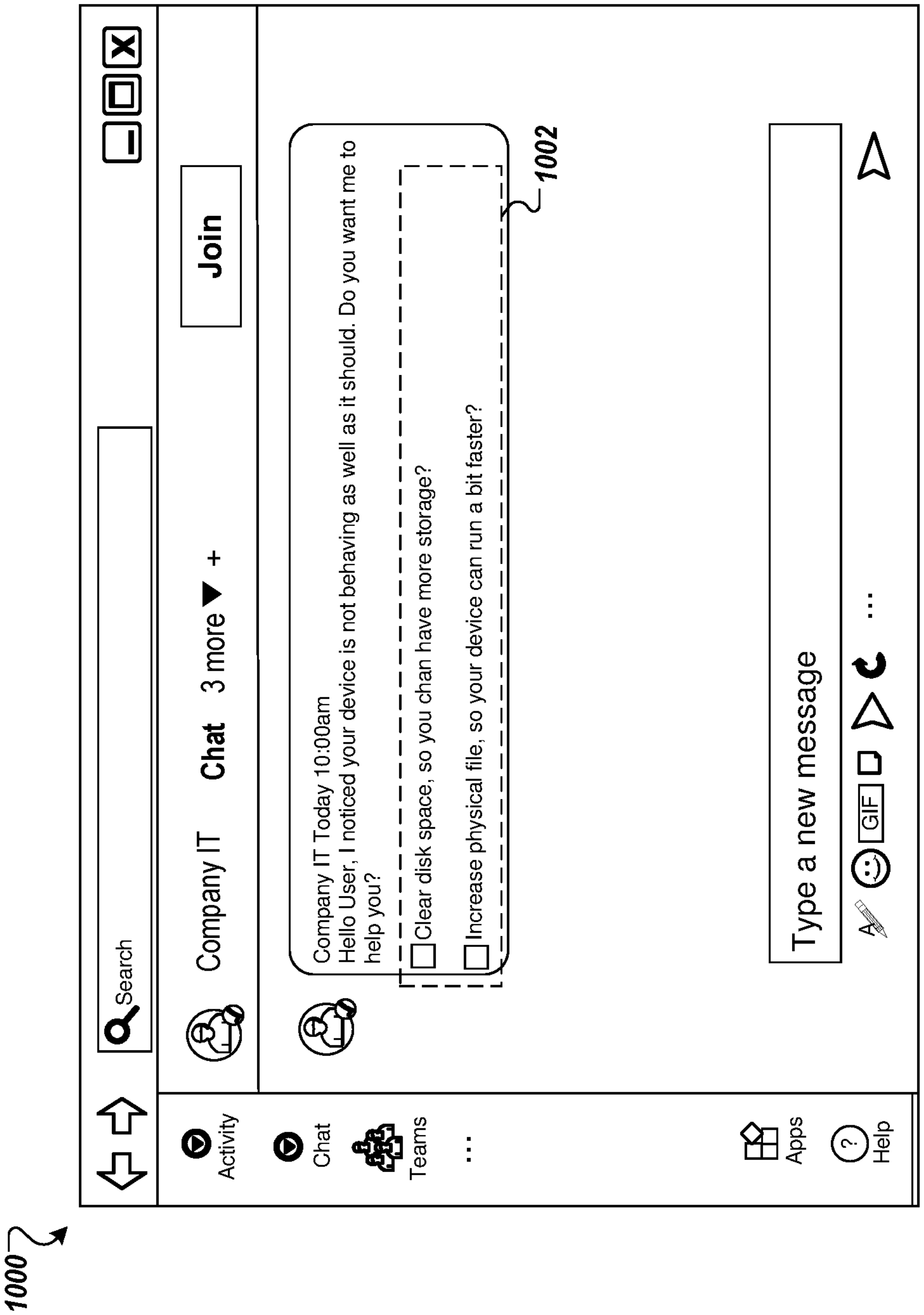
FIG. 10 is an example inquiry that may be implemented in the managed network of FIG. 1.

Additionally or alternatively, the mitigation module 111 may communicate an inquiry 253 to the user 113 of the managed device 106. The inquiry 253 may describe the anomalous state and/or provide instruction or prompting of a user-implemented solution. In some embodiments, the user 113 may communicate a response 255 to the inquiry 253. An example inquiry 253 is depicted in FIG. 10. The response 255 may be communicated to the CDI modification engine 204, which may further communicate with the weight module 231 to modify one or more weights of the CDI expression 239, as described with reference to FIG. 2D.

The mitigation module 111 may be configured to communicate the CDI 251, the response 255, etc. to a CDI storage 283. The CDI storage 283 may be an example of the memory 512 described with reference to FIG. 5. Over a period of time multiple (e.g., fifty, sixty, one hundred, etc.) CDI 251 values may be stored at the CDI storage 283 along with the responses 255. The information stored in the CDI storage 283 may be accessible to the CDI modification engine 204 when evaluating weights in the CDI expression 239.

Figure 3:
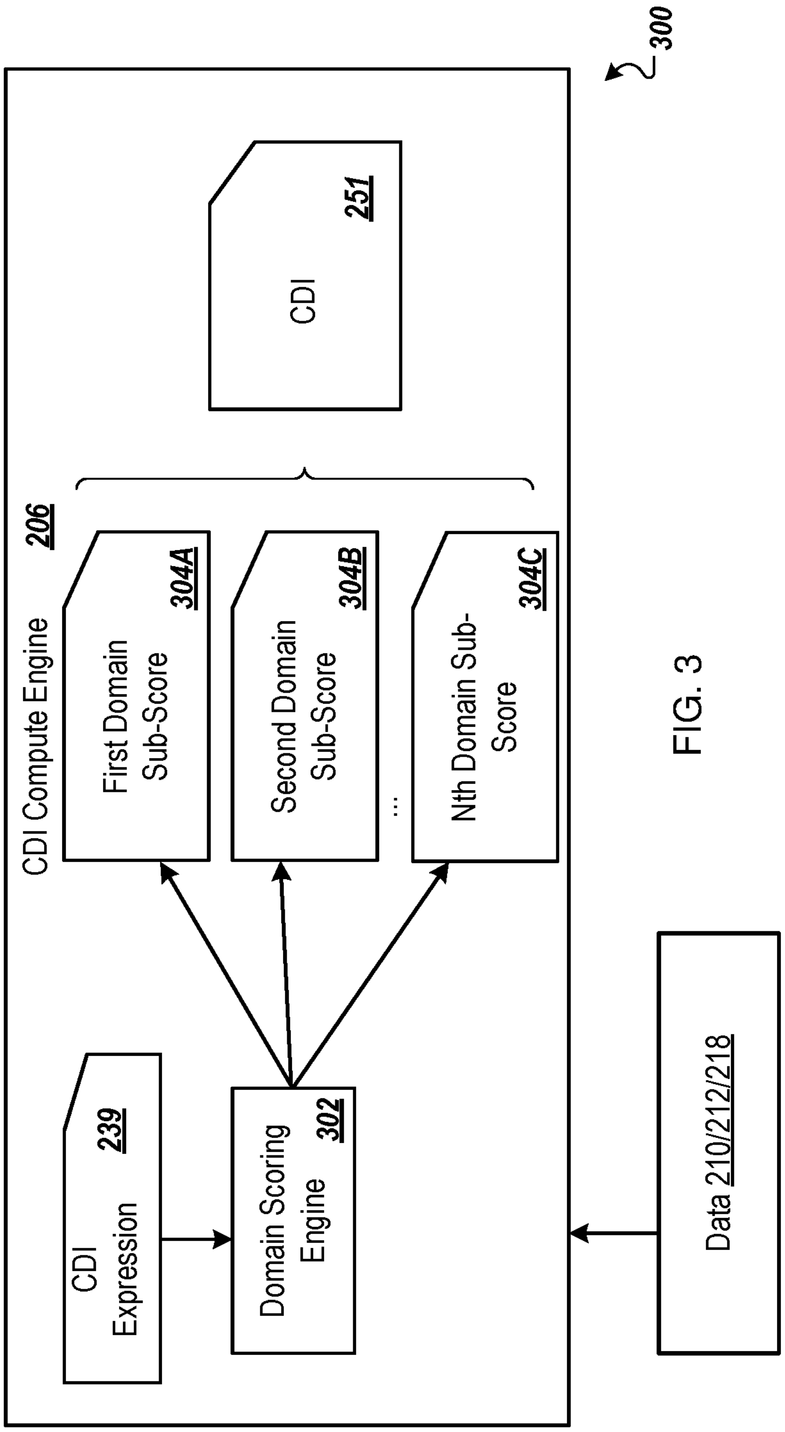
FIG. 3 is a block diagram of an example of a CDI compute process that may be implemented by the CDI compute engine of FIGS. 2A-2D.

Referring to FIG. 3, a block diagram of an example of a CDI compute process 300 is depicted that may be implemented by the CDI compute engine 206 of FIGS. 2A-2D. In the CDI compute process 300, the data 210, 212, and 218 may be received by the CDI compute engine 206.

The CDI compute engine 206 may include a domain scoring engine 302. The domain scoring engine 302 may use the CDI expression 239. Additionally, the domain scoring engine 302 may be configured to categorize the data 210, 212, and 218 based on a domain. Related domains are defined as a domain. For instance, as described elsewhere in the present disclosure, a first domain of a first part of the attribute data 210 may be an agent on a managed device (e.g., the agent 121 of the managed device 106). The first part of the attribute data 210 accessed from the managed device may include battery life standard, a CPU usage standard, a memory usage standard, and the like. A second domain of a second part of the attribute data 210 may be endpoint management engine (e.g., the endpoint management engine 219). The second part of the attribute data 210 accessed from the endpoint management engine may include a user profile. Because both the first part and the second part of these attributes are device attributes, the domain scoring engine 302 may categorize them as being from a device domain. Similarly, the domain scoring engine 302 may categorize the rest of the data 210, 212, and 218 according to domains. Some example domains include the device domain, a security domain, an application domain, and a service management domain.

The domain scoring engine 302 may compute a sub-score of the attributes in the domains. For example, the domain scoring engine 302 may output a first domain sub-score 304A, a second domain sub-score 304B, and a nth domain sub-score 304C. Data representative of the domain sub-scores 304A-304C (generally, domain sub-score or scores 304) may be caused to be displayed. The domain sub-scores may be combined into the CDI 251.

Figure 4:
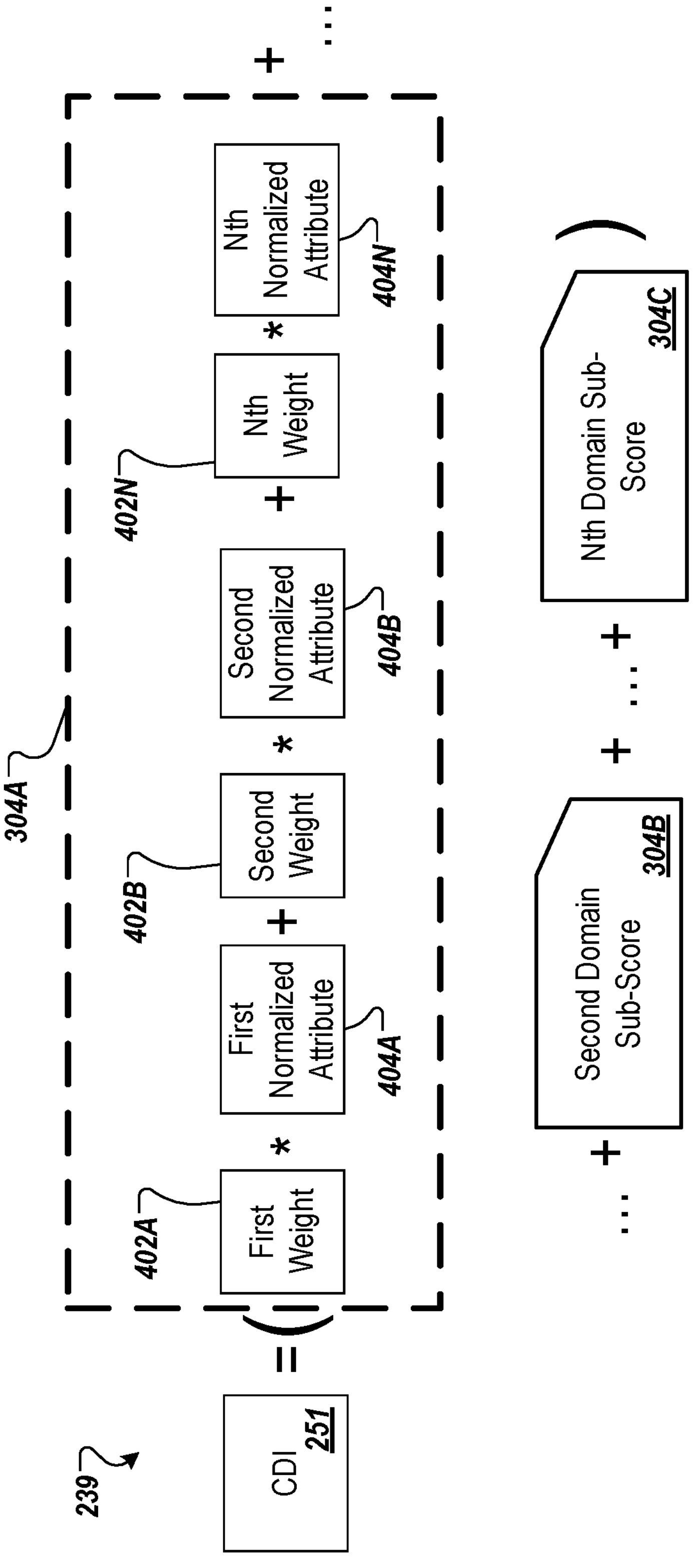
FIG. 4 illustrates an example CDI expression that may be implemented in the CDI compute process of FIG. 3.

FIG. 4 illustrates a simplified example CDI expression 239 that may be implemented in the CDI compute process 300 of FIG. 3, the analysis process 211 of FIG. 2B, the mitigation process 209 of FIG. 2C, or some combination thereof. The CDI expression 239 is a combination of weighted, normalized attribute values. In the embodiment of FIG. 4, the CDI expression 239 is a combination of the domain sub-scores 304. The CDI expression 239 includes the first domain sub-score 304A that includes weights 402A-402N. The weights 402A-402N are assigned to the normalized attribute values 404A-404N of the first domain. The weights 402A-402N are multiplied by the attribute values 404A-404N to compute the first domain sub-score 304A. The first domain sub-score 304A is then combined with the second domain sub-score 304B, etc. to compute the CDI 251.

FIG. 2D illustrates a block diagram of an example modification process 207 according to at least one embodiment of the present disclosure. The modification process 207 receives as input the CDIs 251, the responses 255, current data 210, 212, 218, inconsistencies between evaluation of the CDI 251 and other data 210, 212, 218 or combinations thereof. Based on the input, the CDI modification engine 204 may use one or more of the analytic tools 281 to modify one or more weights of the CDI expression 239.

For instance, the modification process 207 may be initiated or performed by the CDI modification engine 204. The CDI modification engine 204 may receive results of the evaluation between the CDI 251 and the NDIR 237. The evaluation of the CDI 251 relative to the NDIR 237 may give an indication of whether the managed device 106 is in a normal operational state or an anomalous state. For instance, when the CDI 251 is outside the NDIR 237, the DEXI engine 107 infers that the managed device 106 is in an anomalous state. When the CDI 251 is within the NDIR 237, the DEXI engine 107 infers that the managed device 106 is in a normal state. As discussed above, based on this inference, the mitigation module 111 may implement one or more corrective actions.

Inconsistencies between the inferred state and an actual state or patterns of inconsistencies over periods of time may prompt the CDI modification engine 204 to modify the CDI expression 239. For instance, the evaluation between the CDI 251 and the NDIR 237 may indicate that the managed device 106 is in the normal operational state. During this period, the DEXI engine 107 may receive data 210, 212, 218 such as the ticket data 218 that indicates that the actual state of the managed device 106 is anomalous. Accordingly, the inference based on the CDI 251 and the NDIR 237 indicates normal operation, but the ticket data 218 indicates an anomalous state.

Similarly, the evaluation between the CDI 251 and the NDIR 237 may indicate that the managed device 106 is in an anomalous operational state. During this period, the DEXI engine 107 or the mitigation module 111 may communicate a survey or inquiry 253 to the managed device 106. The mitigation module 111 may receive the response 255 to the inquiry 253. The response 255 might indicate that the managed device 106 is not in the anomalous state. Accordingly, the actual state of the managed device 106 is inconsistent with the inference drawn from evaluation of the CDI 251 and NDIR 237.

The data 210, 212, 218 that contradicts the CDI 251/NDIR 237 inference, other current attribute data 210, the CDI 251, the response 255, or combinations thereof may be stored at the CDI storage 283. The CDI storage 283 enables modification to the weights based on patterns of activity on the managed device 106. For instance, a single inconsistency may not prompt a modification to the weights. Instead, the modification process 207 may be based on a longer period of behavior to determine patterns of behavior of the managed device 106.

The information of the CDI storage 283 may be evaluated by the CDI modification engine 204. For instance, following multiple inconsistencies (e.g., five, ten, or twenty) inconsistencies, the CDI modification engine 204 may evaluate the CDI expression 239. In some embodiments, the CDI modification engine 204 may use the analytic tools 281, such as the unsupervised ML model 223 and/or the supervised ML model 235, to assess the weights assigned in the CDI expression 239.

Responsive to the CDI modification engine 204 determining that one or more of the weights should be modified, the CDI modification engine 204 may communicate an instruction to the weight module 231 to modify one or more of the weights (e.g., 402 of FIG. 4) of the CDI expression 239. Modification to the weights might change the contribution of one or more attributes when computing the CDI 251. Following the modification to the weights, the CDI expression 239 may generate a CDI 251 that is outside the NDIR 237 in the anomalous circumstance or within the NDIR 237 during normal operation.

In some embodiments, the CDI modification engine 204 may modify two or more weights. Modification of two or more weights may reduce the weight assigned to a first attribute and increase the weight assigned to a second attribute. Accordingly, following the modification, the second attribute makes a larger contribution, and the first attribute makes a smaller contribution to the CDI 251. The CDI modification engine 204 may occur on an on-going basis in the managed network 110.

In some embodiments, the CDI modification engine 204 may not be responsive only to inconsistencies. Instead, in these and other embodiments, the CDI modification engine 204 may assess the CDI expression 239 periodically to optimize the CDI expression 239.

Figure 5:
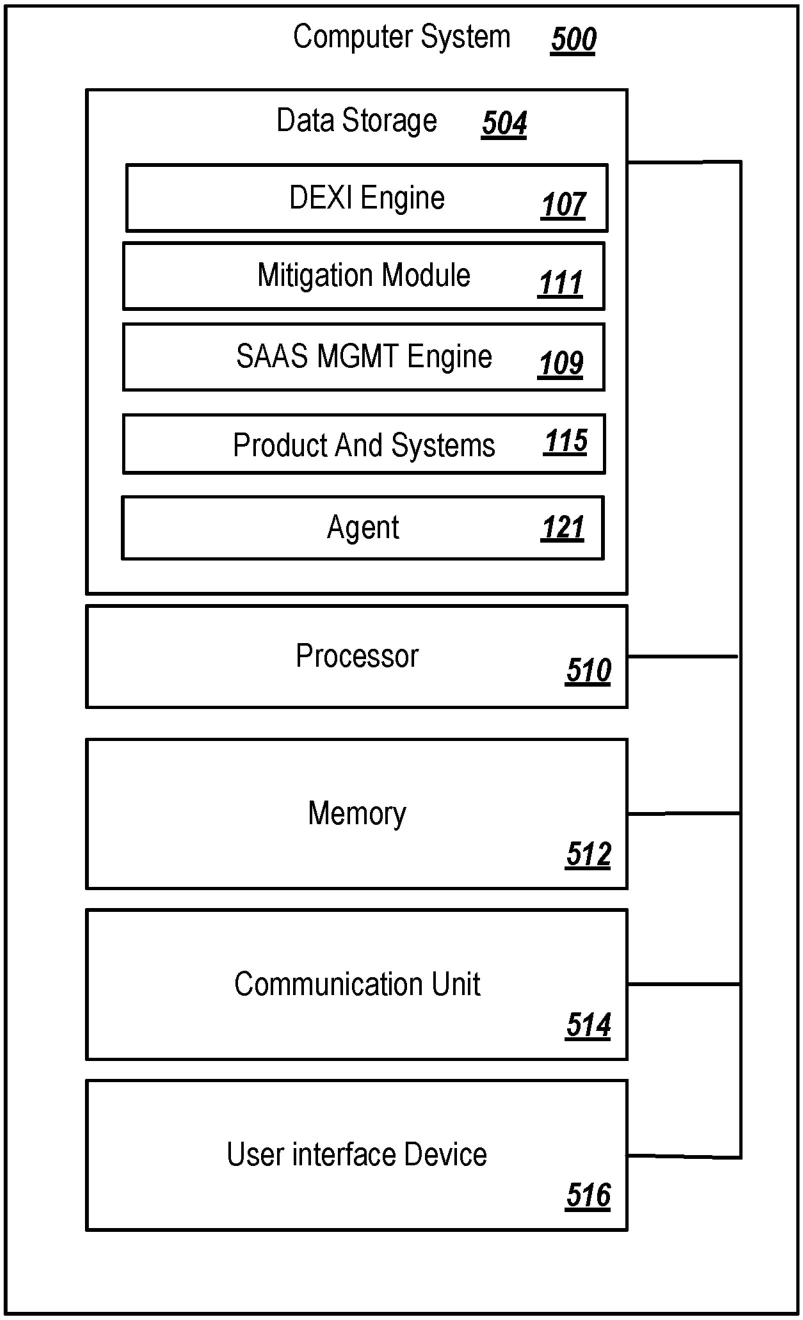
FIG. 5 illustrates an example computer system configured for device-level evaluation of a digital experience.

FIG. 5 illustrates an example computer system 500 configured for device-level evaluation of a digital experience, according to at least one embodiment of the present disclosure. The computer system 500 may be implemented in the operating environment 100 FIG. 1, for instance. Examples of the computer system 500 may include the cloud management device 104, one or more of the managed devices 106, or some combination thereof. The computer system 500 may include one or more processors 510, a memory 512, a communication unit 514, a user interface device 516, and a data storage 504 that includes one or more or a combination of the DEXI engine 107, the agent 121, the products 115, the SAAS management engine 109, and the mitigation module 111 (collectively, system modules).

The processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 5, the processor 510 may more generally include any number of processors configured to perform individually or collectively any number of operations described in the present disclosure. Additionally, one or more of the processors 510 may be present on one or more different electronic devices or computing systems. In some embodiments, the processor 510 may interpret and/or execute program instructions and/or process data stored in the memory 512, the data storage 504, or the memory 512 and the data storage 504. In some embodiments, the processor 510 may fetch program instructions from the data storage 504 and load the program instructions in the memory 512. After the program instructions are loaded into the memory 512, the processor 510 may execute the program instructions.

The memory 512 and the data storage 504 may include computer-readable storage media for carrying or having computer-executable instructions or data structures stored thereon. Such computer-readable storage media may include any available media that may be accessed by a general-purpose or special-purpose computer, such as the processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 514 may include one or more pieces of hardware configured to receive and send communications. In some embodiments, the communication unit 514 may include one or more of an antenna, a wired port, and modulation/demodulation hardware, among other communication hardware devices. In particular, the communication unit 514 may be configured to receive a communication from outside the computer system 500 and to present the communication to the processor 510 or to send a communication from the processor 510 to another device or network (e.g., the network 108 of FIG. 1).

The user interface device 516 may include one or more pieces of hardware configured to receive input from and/or provide output to a user. In some embodiments, the user interface device 516 may include one or more of a speaker, a microphone, a display, a keyboard, a touch screen, or a holographic projection, among other hardware devices.

The system modules may include program instructions stored in the data storage 504. The processor 510 may be configured to load the system modules into the memory 512 and execute the system modules. Alternatively, the processor 510 may execute the system modules line-by-line from the data storage 504 without loading them into the memory 512. When executing the system modules, the processor 510 may be configured to perform one or more processes or operations described elsewhere in this disclosure.

Modifications, additions, or omissions may be made to the computer system 500 without departing from the scope of the present disclosure. For example, in some embodiments, the computer system 500 may not include the user interface device 516. In some embodiments, the different components of the computer system 500 may be physically separate and may be communicatively coupled via any suitable mechanism. For example, the data storage 504 may be part of a storage device that is separate from a device, which includes the processor 510, the memory 512, and the communication unit 514, that is communicatively coupled to the storage device. The embodiments described herein may include the use of a special-purpose or general-purpose computer including various computer hardware or software modules, as discussed in greater detail below.

Figure 6A:
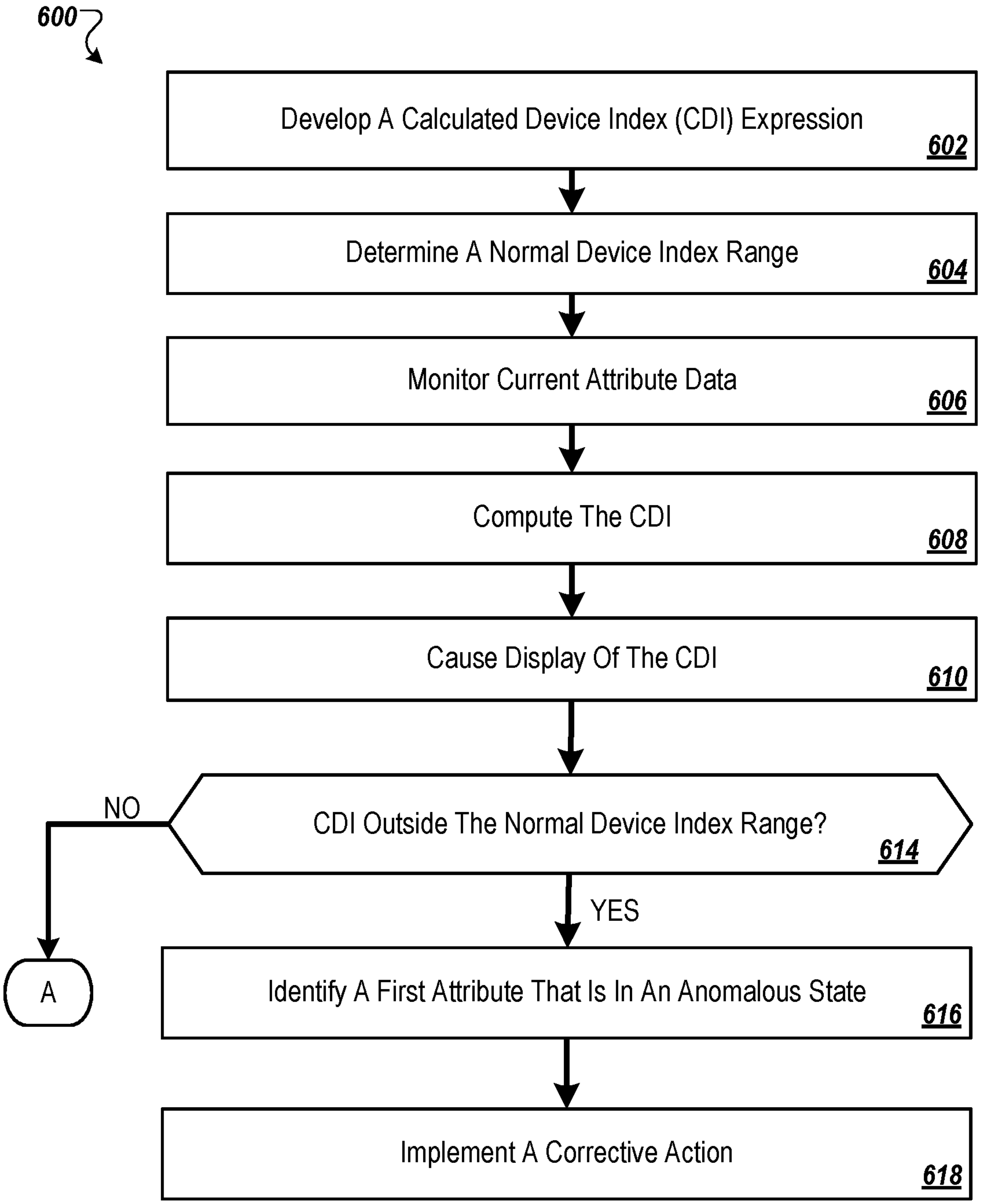
FIGS. 6A and 6B are a flow chart of an example method of device-level evaluation of a digital experience and mitigation of corrective action.
Figure 6B:
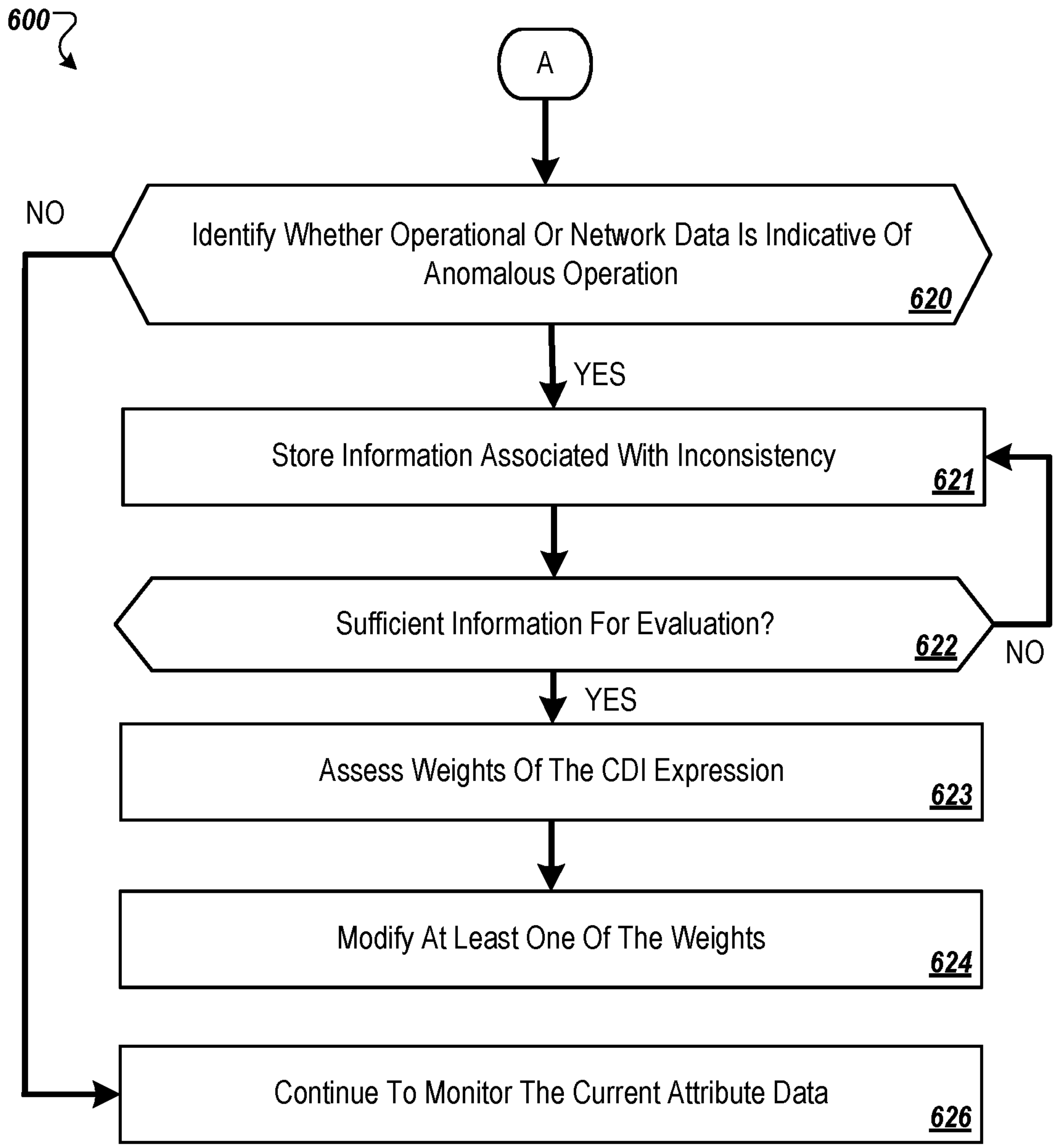

FIGS. 6A and 6B are a flow chart of an example method 600 of device-level evaluation of a digital experience and mitigation of corrective action, according to at least one embodiment of the present disclosure. The method 600 may be performed in a suitable operating environment such as the operating environment 100 or the managed network 110 of FIG. 1.

The method 600 may begin at block 602 in which a CDI expression is developed. The CDI expression may be developed for a managed device such as the managed device 106 of the managed network 110. In some embodiments, the CDI expression includes a combination of weighted, normalized attribute values. In some embodiments, development of the CDI expression may include accessing historical and other attribute data representative of attributes and of operational data. The operational data and the attribute data enable identification of normal operation of the managed device. The CDI expression may be further based on evaluation of interactions between the attributes relative to one another and relative to the operational data. The evaluation of the interactions is conducted to identify attribute contributions during the normal operation and during the anomalous operation. The attribute contributions are the extent to which each attribute contributes to the anomalous operation or to the normal operation. Weights are assigned to the attributes. The weight reflects the attribute contribution of the attribute to which the weight is assigned. An additional example of developing the CDI expression is provided with reference to the method 700 of FIG. 7 described below.

At block 604, a NDIR may be determined. The NDIR defines values or a range of values of a CDI that are indicative of normal operation of the managed device. At block 606, current attribute data may be monitored. The current attribute data may be monitored during operation of the managed device. At block 608, a CDI may be computed. The CDI may be computed based at least in part on the current attribute data. The CDI is computed using the CDI expression.

At block 610, the CDI may be caused to be displayed or presented. For instance, data representative of the CDI may be caused to be displayed in a user interface such that an administrator or a user may be able to view the CDI.

At block 614, the computed CDI is evaluated relative to the NDIR. In some embodiments, it may be determined whether the CDI is outside the NDIR. In response to the CDI being outside the NDIR ("YES" at block 614), the method 600 may proceed to block 616. In response to the CDI being within the NDIR ("NO" at block 614), the method 600 may proceed to block 620 of FIG. 6B.

At block 616, a first attribute may be identified that is in an anomalous state and/or contributed to the CDI. The anomalous state of the first attribute may indicate that the first attribute is outside of an attribute value range for normal operation of the managed device. At block 618, a corrective action may be implemented to mitigate the anomalous condition. In some embodiments, the implementing the corrective action includes identifying a component of the managed device or of the managed network that affects the first attribute. The corrective action implemented on the component may include a modification to change a state of the component such that the computed CDI is within the NDIR.

Additionally or alternatively, the implementing the corrective action may include communicating an inquiry to a user of the managed device. The inquiry may describe the anomalous state and/or provide instruction or prompting of a user-implemented solution. In some embodiments, a response to the inquiry may be received. The response may be used in the operations of blocks 620, 622, or 624 in some embodiments. For instance, the response might indicate that the managed device is not in an anomalous state. Additionally, the response may be a parameter used in assessing the weights and/or modifying the weights.

At block 620, it may be determined whether operational or network data is indicative of anomalous operation of the managed device. For instance, because the CDI is within the NDIR, the CDI may indicate that the device is in a state of normal operation. However, at block 620, other data may be considered to determine whether the managed device is actually in the state of normal operation. For instance, if there is a ticket submitted in an ITSM system, then the managed device may be in an anomalous operational state.

Responsive to the operational or network data being indicative of anomalous operation ("YES" at block 620), the method 600 may proceed to block 621. Responsive to the operational or network data not being indicative of anomalous operation ("NO" at block 620), the method 600 may proceed to block 626 in which current attribute data is continued to be monitored.

At block 621, information associated with the inconsistency may be stored. For instance, the information stored may include the computed CDI, responses received from users, current attribute data, attribute data at the time of the inconsistency, or combinations thereof.

At block 622, it may be determined whether there is sufficient information to assess the weights of the CDI expression. Responsive to there being sufficient information ("YES" at block 622), the method 600 may proceed to block 623. Responsive to there being insufficient information ("NO" at block 622), the method 600 may continue to store information as described with reference to block 621.

At block 623, weights of the CDI expression may be assessed. For instance, if there is a pattern of inconsistencies such as an anomalous state when the CDI is within the NDIR or a normal state when the CDI is outside the NDIR, one or more of the weights may be incorrect. That is, a weight assigned to an attribute might be too high or too low. At block 624, at least one of the weights may be modified. For instance, one or more of the weights of the CDI expression may be modified. The weights may be modified such that the computed CDI is not within the NDIR. For instance, a first weight of the first attribute may be modified such that the computed CDI is within the NDIR. Additionally or alternatively, a second weight of a second attribute may be modified such that the CDI is more affected by the second attribute than the first attribute. In some embodiments, modification of the first weight and/or the second weight may be performed using a supervised ML model.

Figure 7:
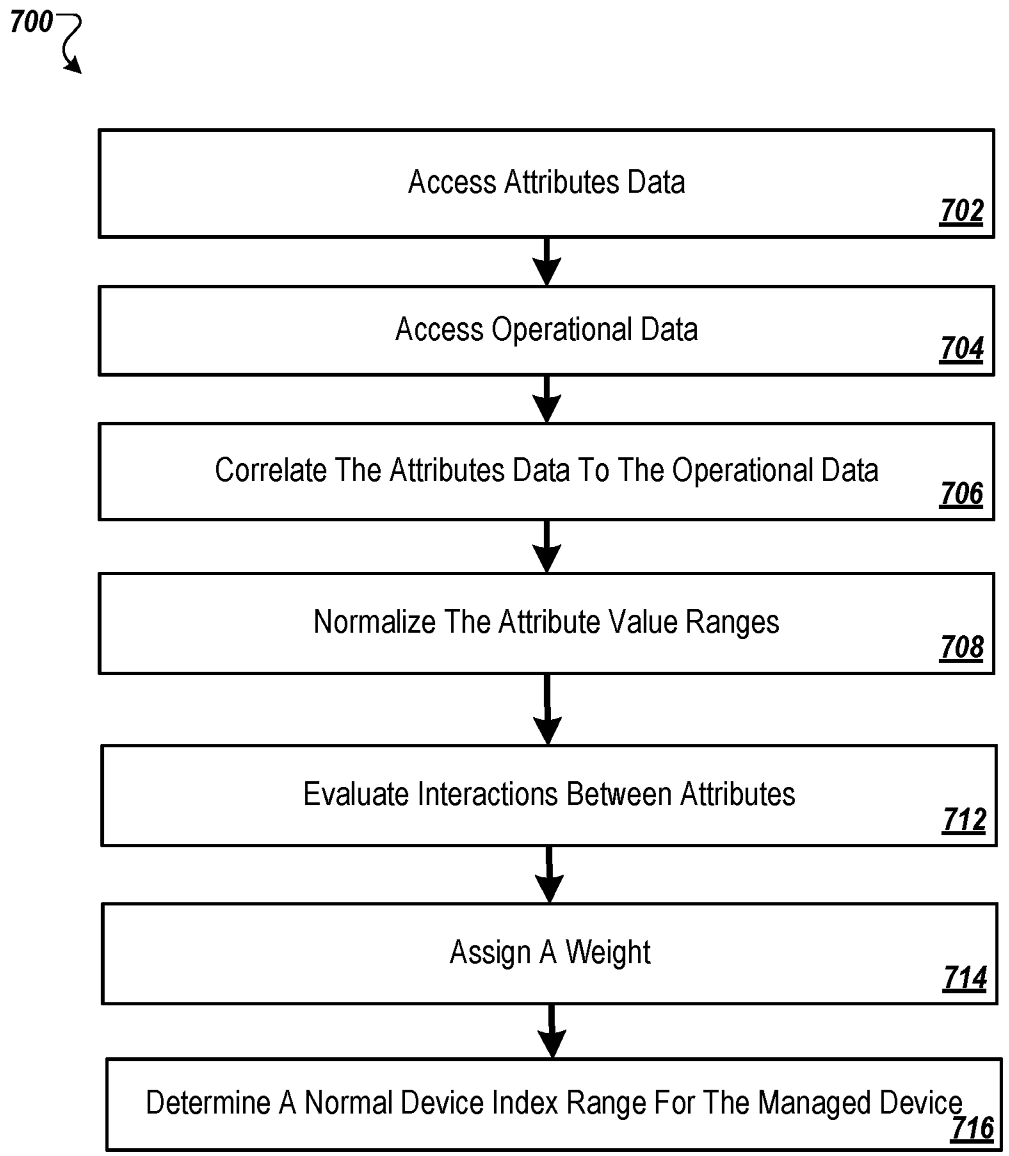
FIG. 7 is a flow chart of an example method of developing a calculated device index expression.

FIG. 7 is a flow chart of an example method 700 of developing a CDI expression, according to at least one embodiment of the present disclosure. The method 700 may be performed in a suitable operating environment such as the operating environment 100 or the managed network 110 of FIG. 1. The method 700 may be implemented as part of another method. For instance, the method 700 may be implemented as part of the operation of block 602 of the method 600 or part of the operation of block 804 of the method 800 of FIG. 8.

The method 700 may begin at block 702 in which attributes data may be accessed. The attribute data may be representative of attributes associated with a managed device such as the managed device 106 of the managed network 110 of FIG. 1. One or more or each attribute may reflect a digital experience metric of a user relative to the managed device. In some embodiments, the attributes data of block 702 may be historical attributes data, which may be stored and accessed via a data repository. Additionally or alternatively, the attributes data may be accessed during a specific period of time during which the CDI expression is developed. For instance, the specific period of time may be immediately following enrollment of the managed device in the managed network, following a change (e.g., update to OS, addition of a new program or application, installing a new hardware device, changes to the managed network, etc.) to the managed device, during an initialization period of the managed device, etc. Additionally, the specific period of time may be related to a change to the user. For instance, the user associated with the managed device may change role in an enterprise (e.g., receive a promotion or demotion) or may move to another group within the company. Alternatively, the managed device may be re-assigned to a different user or be reconfigured for a different function (e.g., moving a printer to support another group). In these and other embodiments, a DEXI may not be available during at least a part of the specific period of time in which the attributes data is accessed.

Additionally or alternatively, in some embodiments, the attributes data may be derived from a similar managed device. For instance, the similar managed device may have similar characteristics (e.g., type of device, similarity of role in an enterprise, etc.) to the managed device for which the CDI expression is being developed. In these implementations, the attributes data of the similar managed device may be accessed instead of attribute data directly associated with the managed device.

At block 704, operational data may be accessed. The operational data enables identification of normal operation of the managed device and anomalous operation of the managed device. In some embodiments, the operational data may include standards related to components and products on the managed device. For instance, the operational data might include a battery life standard, a CPU usage standard, a memory usage standard, and the like. Additionally, the operational data might include information related to a user profile that indicates the systems and products operated by a user of the managed device. In some embodiments, the operational data may be some portion of the attributes data and may be accessed in the same operation. In these and other embodiments, the operation data may be identified within or accessed from the attribute data.

At block 706, the attributes data may be correlated to the operational data. The attributes data may be correlated to the operational data to identify attribute value ranges during the normal operation and the attribute value ranges during anomalous operation. For instance, the normal operation of the managed device may be identified. During these periods, values for one or more of the attributes may be identified. As the normal operation transitions to the anomalous operation, values of the attributes and changes thereto may be analyzed. Similarly, the anomalous operation of the managed device (e.g., during periods of inoperability or user frustration) may be identified. During these periods, values for the attributes may be identified. Accordingly, ranges of values of the attributes during periods of normal operation and anomalous operation may be identified. In some instances, the anomalous operation may be because a single attribute (e.g., a battery died) or combinations of attributes (e.g., an application is not patched causing inoperability, application failure, and CPU usage increase).

At block 708, the attribute value ranges may be normalized. In general, the normalization operation brings each of the attribute value ranges within a particular, standard range (e.g., a range from 0 to 1, from 0 to 100, etc.). Normalization may enable different attributes to be compared. As a general example, two attributes may be MTTR and CPU usage. The MTTR range for normal operation may be between 20 minutes and 59 minutes. The CPU usage range for normal operation may be between 20% and 70%. To enable the MTTR range to be combined with the CPU usage range, the two attribute value ranges may be normalized. In detail, (based on a point-slope calculation) the MTTR value may be multiplied by ($1/39$) and a value of ($20/39$) may be subtracted from the product to get a value between 0 and 1. The CPU usage range (again using point-slope calculation) may be multiplied by ($1/50$) and a value of ($2/5$) is subtracted from the product to get a value between 0 and 1. Additionally, normalization parameters may be generated that are used to normalize the attribute data.

At block 712, interactions between attributes may be evaluated. The interactions may be between the attributes relative to one another and/or the attributes and the operational data. The interactions between the attributes may be evaluated to identify attribute contributions. The attribute contributions are the extent to which each attribute contributes to an anomalous operation or to a normal operation. In some embodiments, the evaluating the interactions is performed using an unsupervised ML model.

At block 714, a weight may be assigned to one or more or each of the attributes. The weight reflects the attribute contribution of the attribute to which the weight is assigned during the normal operation. The weights may be modified during operation of a device-level evaluation of a digital experience as described elsewhere in the present disclosure.

At block 716, a NDIR may be determined. The NDIR may be determined for the managed device. In some embodiments, the NDIR may include a combination of the normalized attribute value ranges during normal operation of the managed device. In some embodiments, the NDIR may be based on a role of the user in an enterprise. In some embodiments, the identifying the attribute value ranges and the determining the NDIR are performed using a statistical model to standardize values for the NDIR and the attribute value ranges.

In some embodiments, the NDIR may be applied from a similar managed device. As described above, the similar managed device might include a similar device type or role, for instance. The NDIR for the similar managed device may be applied to the managed device at least temporarily. For instance, in response to enrollment of the managed device, the NDIR of the similar managed device might be applied. Similarly, the NDIR determined for the managed device may be applied to additional similar managed devices.

Figure 8:
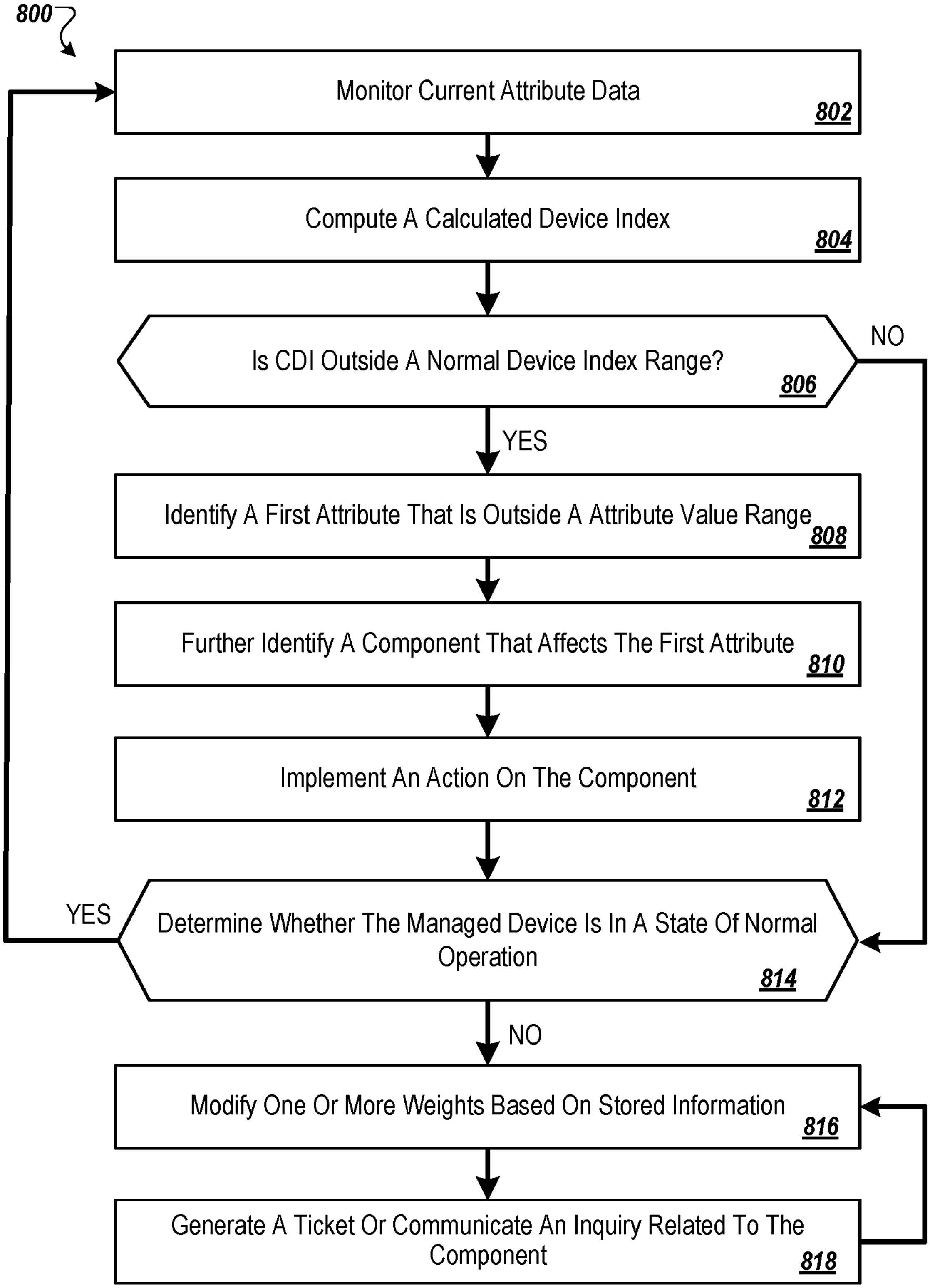
FIG. 8 is a flow chart of another example method of device-level evaluation of digital experience.

FIG. 8 is a flow chart of an example method 800 of device-level evaluation of digital experience, according to at least one embodiment of the present disclosure. The method 800 may be performed in a suitable operating environment such as the operating environment 100 or the managed network 110 of FIG. 1.

The method 800 may begin at block 802 in which current attribute data may be monitored. The attribute data may be monitored during operation of a managed device. The attribute data may be representative of multiple attributes, which may represent metrics related to a digital experience of the managed device.

In some embodiments, the attributes include two or more subsets of attributes that originate from separate domains. For instance, in some embodiments the attributes include a first subset of attributes that originates from a first domain, a second subset of attributes that originates from a second domain, a third subset of attributes that originates from a third domain, a fourth subset of attributes that originates from a fourth domain, etc. As discussed elsewhere, some example embodiments include four subsets of attributes. For instance in these and other embodiments, the first subset of attributes may include device attributes. The first domain of the device attributes may include operational data from the managed device. The first subset of attributes may include one or more or a combination of: device age, battery status, central processing unit (CPU) usage, memory usage, storage usage, an operating system (OS) update, an OS install date, a boot degradation, a user profile or a portion of the user profile, a system failure indication, a blue screen error notification.

The second subset of attributes includes security attributes and security data. The second domain of the security attributes may be a security management system associated with the managed device. The second subset of attributes includes one or more or a combination of antivirus status, firewall status, spyware status, data protection indicators, password strength, patch status, user access control status, risk-based vulnerability assessment.

The third subset of attributes includes service management attributes. The third domain includes data from a service management system implemented to support the managed device. The third subset of attributes includes one or more or a combination of an incident report, a description and subject of an incident report or ticket, a priority or urgency of an incident report, a mean time to resolve (MTTR), a current status of an incident, a first call resolution, an escalation of an incident, and an inquiry or inquiry response.

The fourth subset of attributes may include an application attribute. The fourth domain includes data from an application management system. The fourth subset of attributes may include one or more or a combination of an application error, a license status of an application, cloud service usage, a cloud service outage, service mapping, application telemetry, application usage indicative of user frustration, an application log, a digital signature of an application, an application scan, survey bot inquiries and responses, and information from bots scheduled to logon to application.

At block 804, a CDI may be computed. The CDI may be based on the current attribute data and a CDI expression. The CDI expression may be a sum of each of the assigned weights applied to the attributes in some embodiments. An example of development of the CDI expression may be according to the method 700 described elsewhere in the present disclosure.

At block 806, it may be determined whether the CDI is outside of a NDIR. For example, the CDI may be higher than a highest value of the NDIR or lower than a lowest value of the NDIR to be outside the NDIR or between the highest value of the NDIR and the lowest value of the NDIR to be within the NDIR. In response to the CDI being outside the NDIR ("YES" at block 806), the method 800 may proceed to block 808. In response to the CDI being within the NDIR ("NO" at block 806), the method 800 may proceed to block 814, which is described elsewhere.

At block 808, a first attribute may be identified that is outside an attribute value range of the first attribute. For example, in some embodiments, attribute value ranges may be determined for each attribute based on historical attribute data during normal operation and anomalous operation of the managed device.

At block 810, a component that affects the first attribute may be identified. The component may be hardware or software component of the managed device, a managed network, a communication network, etc. At block 812, an action may be implemented on the component to modify a state of the component. The state of the component may be modified such that the CDI is within the NDIR in some embodiments. In some embodiments, the NDIR may be based on a role of the user in an enterprise. In these and other embodiments, the implementing the action on the component is at least partially based on the role. For example, the NDIR for test devices may have a limit value of 80 and the NDIR for a client support device may have a limit value of 100. In this example, the CDI for both devices may be 81. Thus, the action on the component may be implemented on the test device, but not on the client support device.

At block 814, it may be determined whether the managed device is in a state of normal operation or in a state of anomalous operation. For instance, the CDI and the NDIR may not be the only consideration of the method 800. In block 814, an additional operation may be implemented to assess a state of the managed device (despite the CDI). Block 814 may be implemented while the CDI is outside the NDIR in some embodiments as an additional or supplemental check or implemented at another time. In response to the managed device being in a state of normal operation ("YES" at block 814), the method 800 may proceed to block 802 in which the current attribute data is continually monitored. The method 800 may then proceed through one or more of the blocks 802, 804, 806, 808, 810, 812, 814, 816, 818, or combinations thereof. In response to the managed device being in a state of anomalous operation ("NO" at block 814), the method 800 may proceed to block 816.

At block 816, one or more weights may be modified based on stored information. For instance, information associated with inconsistency may be stored such as the computed CDI, responses received from users, current attribute data, attribute data at the time of the inconsistency, or combinations thereof. Responsive to there being sufficient information being stored, one or more weights of the CDI expression may be modified. That is, in some embodiments the CDI may indicate that a technical issue is being experienced at the managed device. Other data may indicate that the managed device is in a state of normal operation. Thus, the CDI is inconsistent with an actual state. Alternatively, the CDI may indicate that the managed device is operating normally. In contrast, other data (e.g., a ticket submission) may indicate anomalous operation of the managed device. Information related to these inconsistencies may be stored and/or accessed to modify weights. Accordingly, the weights may be modified such that the CDI is consistent with the actual state of the managed device.

In addition to modification of the weights of the CDI expression, in some embodiments, the NDIR may be modified and/or the operations of block 808, 810, 812 or some combination thereof may not be implemented responsive to the managed devices being in a state of normal operation. At block 818, a ticket and/or an inquiry may be generated. The ticket or the inquiry may be related to the component. The ticket may be introduced into an ITSM or ticketing resolution system and implemented by IT personnel or a bot that is configured to automatically change the state or conditions of the component. Additionally or alternatively, the inquiry may be related to the component. The inquiry may be communicated to the user. In some embodiments, the inquiry may survey a user associated with the managed device, may confirm status of the managed device, prompt the user to implement the action, etc. As shown in FIG. 8A, in some embodiments, a ticket resolution and/or a response to the inquiry may affect modification of the weights of block 816 or initiate additional modification of the weights as described with reference to block 816.

The methods 600, 700, and 800 may be performed by the cloud management device 104 described elsewhere in the present disclosure or by another suitable computing system, such as the computer system 500 of FIG. 5. In some embodiments, the cloud management device 104 or the other computing system may include or may be communicatively coupled to a non-transitory computer-readable medium (e.g., the memory 512 of FIG. 5) having stored thereon programming code or instructions that are executable by one or more processors (such as the processor 510 of FIG. 5) to cause a computing system or the cloud management device 104 to perform or control performance of the methods 600, 700, and 800. Additionally or alternatively, the cloud management device 104 may include the processor 510 that is configured to execute computer instructions to cause the cloud management device 104 or other computing systems to perform or control performance of the methods 600, 700, and 800. The cloud management device 104 or the computer system 500 implementing the methods 600, 700, and 800 may be included in a cloud-based managed network, an on-premises system, or another suitable network computing environment. Although illustrated as discrete blocks, one or more blocks in FIGS. 6A-8 may be divided into additional blocks, combined into fewer blocks, or eliminated, depending on the desired implementation.

Further, modifications, additions, or omissions may be made to the methods 600, 700, and 800 without departing from the scope of the present disclosure. For example, the operations of methods 600, 700, and 800 may be implemented in differing order. Furthermore, the outlined operations and actions are only provided as examples, and some of the operations and actions may be optional, combined into fewer operations and actions, or expanded into additional operations and actions without detracting from the disclosed embodiments.

Figure 9:
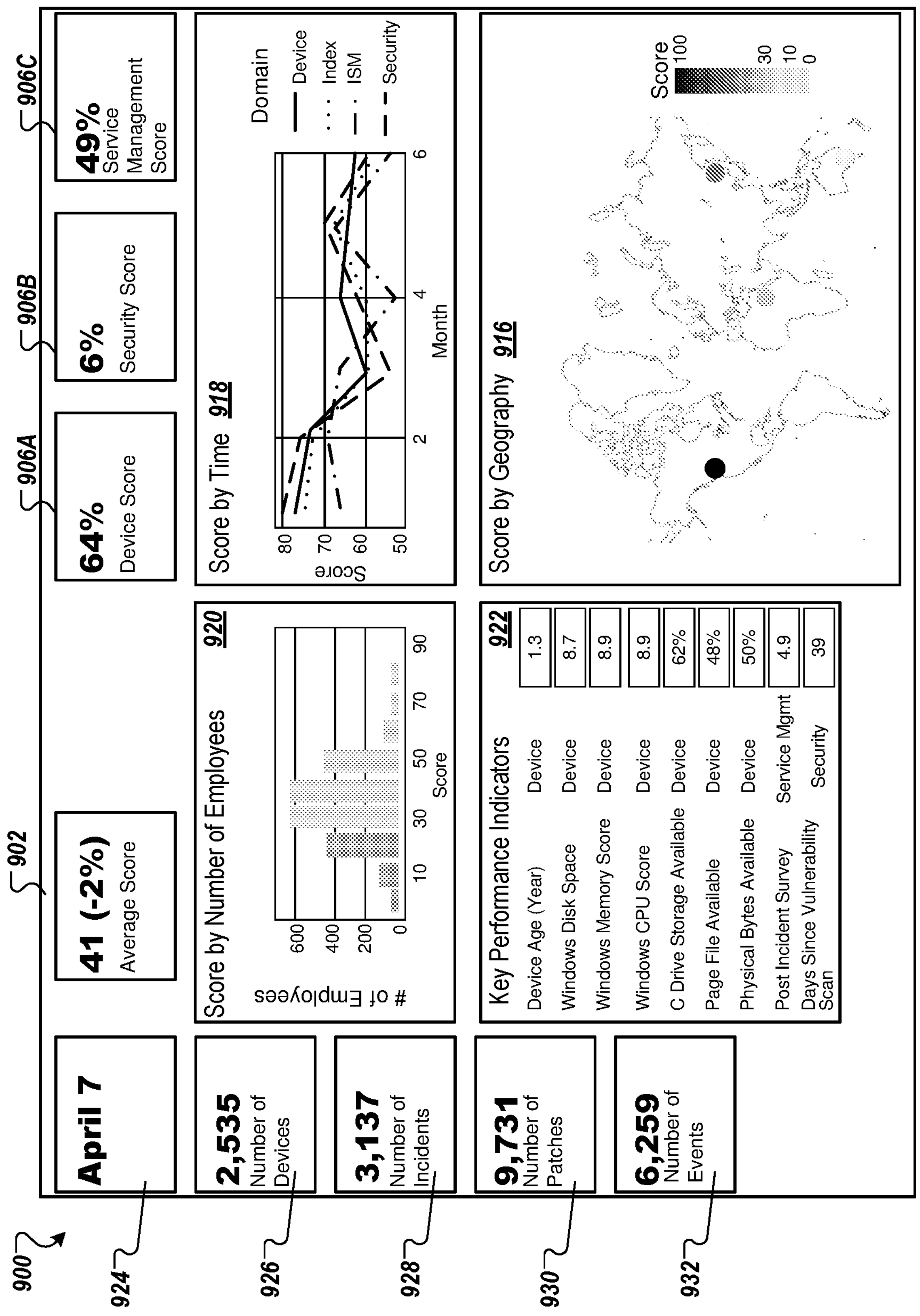
FIG. 9 depicts an example user interface that may be implemented in the managed network of FIG. 1.

FIG. 9 depicts an example user interface 900 that may be implemented in the managed network 110 of FIG. 1 or another suitable managed network. The user interface 900 may include data representative of data related to the CDI (e.g., the CDI 251) and a managed network (e.g., the managed network 110) implementing embodiments of the present disclosure. A date may be displayed in a corner portion 924. Along one edge of the user interface 900, some details of the managed network may be displayed. For instance, the system may include 2535 devices as displayed in a first portion 926, a number of incidents reported in the system (3137) may be displayed in a second portion 928, a number of patches (9731) may be displayed in a third portion 930, and a number of events (6259) may be displayed in a fourth portion 932.

Along a top edge, the user interface 900 may display information related to the CDI of devices included in the managed network. For instance, an average score among the devices (41) along with a change (−2%) may be displayed in a fifth portion 902. Domain sub-scores may be displayed in remaining portions 906A, 906B, and 906C. Additionally, the user interface 900 may include graphics 916, 918, 920, and 922 displaying CDI and domain-specific information.

FIG. 10 is an example inquiry 1000 that may be implemented in the managed network 110 of FIG. 1 or another suitable managed network. The inquiry 1000 may be substantially similar to and correspond to the inquiry 253 in some embodiments. The inquiry 1000 may be communicated to a user (e.g., user 113) of a managed device experiencing a technical issue. The inquiry 1000 may be generated and communicated by a bot. The inquiry 1000 provides an input area 1002 that may be configured to trigger or initiate a corrective action. In the example of FIG. 10, selection of one of the boxes is configured to initiate either a corrective action to clear desk space or increase a physical file allocation.

Figure 11:
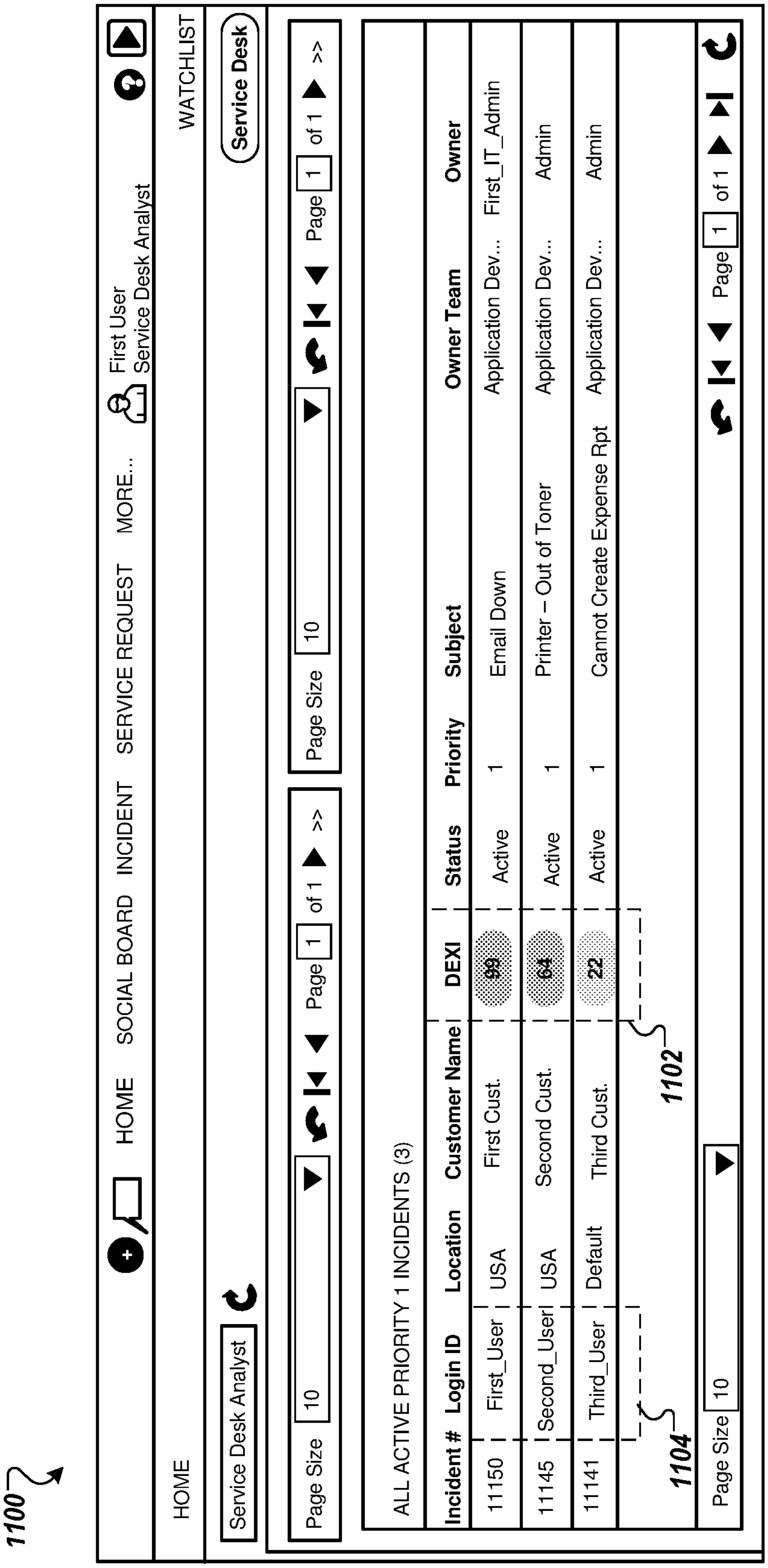
FIG. 11 depicts an example service desk management user interface that integrates user specific DEXI values.

FIG. 11 depicts an example service desk management user interface 1100 that integrates user specific DEXI values 1102. For each of the users 1104, a corresponding DEXI value 1102 is provided. The DEXI values 1102 are displayed along with other information related to IT-related incidents.

Figure 12:
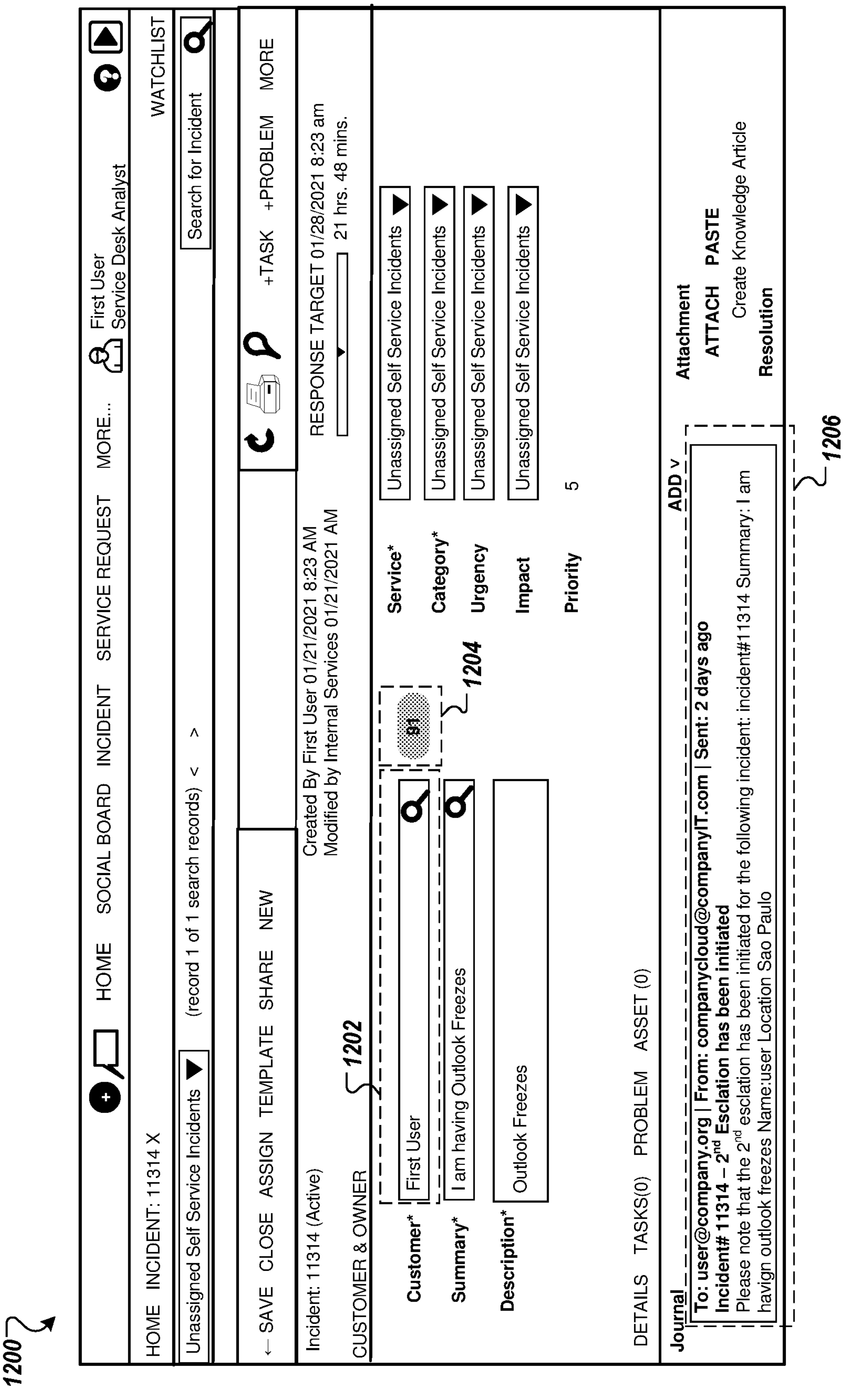
FIG. 12 depicts an example service desk incident user interface that integrates user specific DEXI values, all according to at least one embodiment described in the present disclosure.

FIG. 12 depicts an example service desk incident user interface 1200 that integrates user specific DEXI values 1204. In particular, for a user 1202 (which may correspond to the user 113), a corresponding DEXI value 1204 is displayed. The DEXI values 1204 are displayed along with other information related to IT-related incident 1206.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of automated diagnosis and corrective action implementation at a managed device based on a device-level evaluation of digital experience metrics, the method comprising:

accessing, by a device experience index (DEXI) engine of a cloud management device, attributes data representative of a plurality of attributes associated with the managed device included in a managed network, the managed network implementing software as a service (SAAS) management operations relative to the managed device including service management operations implemented to provide information technology (IT) support to the managed device, security management operations implemented to provide patch management at the managed device, and application management operations implemented to provide access to particular products at the managed device, wherein:

each attribute of the plurality of attributes is a digital experience metric used to calculate a DEXI of a user who is associated with the managed device; and the attributes data includes a first subset of attribute data derived from operation of the managed device, a second subset of attribute data derived from the security management operations, a third subset of attributes derived from the service management operations, and a fourth subset of attribute data derived from application management operations;

further accessing operational data at least partially from the managed device;

based on the operational data, identifying, by the DEXI engine, normal operation of the managed device during which the managed device is in a condition in which components of the managed device function within standard and recommended operational parameter ranges, and anomalous operation of the managed device during which at least one component of the managed device is operating outside the standard and recommended operational parameter ranges;

correlating, by the DEXI engine, the attributes data to the operational data to identify attribute value ranges during the normal operation of the managed device and the attribute value ranges during anomalous operation of the managed device;

normalizing, by the DEXI engine, the attribute value ranges to enable comparisons between the first, the second, and the third subsets of attributes data;

evaluating, by the DEXI engine, interactions between the plurality of attributes relative to one another and relative to the operational data to identify attribute contributions during the normal operation and during the anomalous operation using an unsupervised machine learning model, wherein the attribute contributions are an extent to which each attribute contributes to the anomalous operation or to the normal operation;

assigning, by the DEXI engine, a weight to each attribute of plurality of attributes, wherein the weight reflects the attribute contribution of the attribute to which the weight is assigned during the normal operation;

determining, by the DEXI engine, a normal device index range (NDIR) for the managed device, wherein the NDIR includes a combination of the normalized attribute value ranges during normal operation of the managed device;

after the NDIR is determined, monitoring, by the DEXI engine, current attribute data for the plurality of attributes during real time operation of the managed device;

computing, by the DEXI engine, a calculated device index (CDI) as a sum of each of the assigned weights applied to each of the attributes using the current attribute data;

comparing, by the DEXI engine, the CDI to the NDIR; and responsive to the CDI being outside the NDIR:

inferring, by the DEXI engine, that the managed device is in anomalous operation;

identifying, by the DEXI engine, a first attribute of the plurality of attributes that is outside a first attribute value range of the first attribute;

further identifying, by the DEXI engine, a component of the managed device or of the managed network that affects the first attribute; and automatically implementing, by a mitigation module of the cloud management device, a corrective action on the component to modify the component such that the first attribute is within the first attribute value range and the CDI is within the NDIR.

2. The method of claim 1, further comprising while the CDI is outside the NDIR:

determining that the managed device is actually in normal operation;

responsive to the managed device being in normal operation inconsistent with an inference of the anomalous operation:

storing information related to the CDI and the current attribute data during the period in which the CDI is outside the NDIR and the managed device is in normal operation; and modifying a first weight of the first attribute such that the CDI is within the NDIR.

3. The method of claim 2, further comprising modifying a second weight of a second attribute such that the CDI is more affected by the second attribute than the first attribute, wherein the modifying the first weight is performed using a supervised machine learning model.

4. The method of claim 1, further comprising responsive to the CDI being within the NDIR:

inferring, by the DEXI engine, that the managed device is in a normal operation;

determining that the managed device is actually in anomalous operation;

responsive to the managed device being in the anomalous operation inconsistent with the inference of the normal operation:

storing information related to the CDI and the current attribute data during the period in which the CDI is within the NDIR and the managed device is in anomalous operation; and modifying a first weight of the first attribute such that the CDI is outside the NDIR; and responsive to the managed device being in normal operation, continuing to monitor the current attribute data, wherein a determination that the managed device is in anomalous operation is based on current operational data, and the current operational data includes an acute technical issue reported through a service management system or information identified by an endpoint management system.

5. The method of claim 1, wherein:

the identifying the attribute value ranges and the determining the NDIR are performed using a statistical model to standardize values for the NDIR and the attribute value ranges.

6. The method of claim 1, wherein:

the first subset of attribute data includes data representative one or more or a combination of: device age, battery status, central processing unit (CPU) usage, memory usage, storage usage, an operating system (OS) update, an OS install date, a boot degradation, a user profile or a portion of the user profile, a system failure indication, a blue screen error notification;

the second subset of attribute data includes data representative one or more or a combination of antivirus status, firewall status, spyware status, data protection indicators, password strength, patch status, user access control status, risk-based vulnerability assessment;

the third subset of attribute data includes data representative one or more or a combination of an incident report, a description and subject of an incident report or ticket, a priority or urgency of an incident report, a mean time to resolve (MTTR), a current status of an incident, a first call resolution, an escalation of an incident, and an inquiry or inquiry response; and the fourth subset of attribute data includes data representative one or more or a combination of an application error, a license status of an application, cloud service usage, cloud service outage, service mapping, application telemetry, application usage indicative of user frustration, an application log, a digital signature of an application, application scan, survey bot inquiries and responses, from survey bots, and information from bots scheduled to logon to application.

7. The method of claim 1, further comprising responsive to enrollment of an addition managed device to the managed network applying the determined NDIR to the additional managed device.

8. A non-transitory computer-readable medium having encoded therein programming code executable by one or more processors to perform or control performance of operations of automated diagnosis and corrective action implementation at a managed device based on a device-level evaluation of digital experience metrics, the operations comprising:

accessing attributes data representative of a plurality of attributes associated with the managed device included in a managed network, the managed network implementing software as a service (SAAS) management operations relative to the managed device including service management operations implemented to provide information technology (IT) support to the managed device, security management operations implemented to provide patch management at the managed device, and application management operations implemented to provide access to particular products at the managed device, wherein:

each attribute of the plurality of attributes is a digital experience metric used to calculate a digital experience index (DEXI) of a user who is associated with the managed device; and the attributes data includes a first subset of attribute data derived from operation of the managed device, a second subset of attribute data derived from the security management operations, a third subset of attributes derived from the service management operations, and a fourth subset of attribute data derived from application management operations;

further accessing operational data directly from the managed device;

based on the operational data, identifying normal operation of the managed device during which the managed device is in a condition in which components of the managed device function within standard and recommended operational parameter ranges, and anomalous operation of the managed device during which at least one component of the managed device is operating outside the standard and recommended operational parameter ranges;

correlating the attributes data to the operational data to identify attribute value ranges during the normal operation of the managed device and the attribute value ranges during anomalous operation of the managed device;

normalizing the attribute value ranges to enable comparisons between the first, the second, and the third subsets of attributes data;

evaluating interactions between the plurality of attributes relative to one another and relative to the operational data to identify attribute contributions during the normal operation and during the anomalous operation using an unsupervised machine learning model, wherein the attribute contributions are an extent to which each attribute contributes to the anomalous operation or to the normal operation;

assigning a weight to each attribute of plurality of attributes, wherein the weight reflects the attribute contribution of the attribute to which the weight is assigned during the normal operation;

determining a normal device index range (NDIR) for the managed device, wherein the NDIR includes a combination of the normalized attribute value ranges during normal operation of the managed device;

after the NDIR is determined monitoring current attribute data for the plurality of attributes during real time operation of the managed device;

computing a calculated device index (CDI) as a sum of each of the assigned weights applied to each of the attributes using the current attribute data;

comparing the CDI to the NDIR; and responsive to the CDI being outside the NDIR:

inferring that the managed device is in anomalous operation;

identifying a first attribute of the plurality of attributes that is outside a first attribute value range of the first attribute;

further identifying a component of the managed device or of the managed network that affects the first attribute; and automatically implementing a corrective action on the component to modify the component such that the first attribute is within the first attribute value range and the CDI is within the NDIR.

9. The non-transitory computer-readable medium of claim 8, further comprising while the CDI is outside the NDIR:

determining that the managed device is actually in normal operation;

responsive to the managed device being in normal operation inconsistent with an inference of the anomalous operation:

storing information related to the CDI and the current attribute data during the period in which the CDI is outside the NDIR and the managed device is in normal operation; and modifying a first weight of the first attribute such that the CDI is within the NDIR.

10. The non-transitory computer-readable medium of claim 9, further comprising modifying a second weight of a second attribute such that the CDI is more affected by the second attribute than the first attribute, wherein the modifying the first weight is performed using a supervised machine learning model.

11. The non-transitory computer-readable medium of claim 8, further comprising responsive to the CDI being within the NDIR:

inferring, by the DEXI engine, that the managed device is in a normal operation;

determining that the managed device is actually in anomalous operation;

responsive to the managed device being in the anomalous operation inconsistent with the inference of the normal operation:

storing information related to the CDI and the current attribute data during the period in which the CDI is within the NDIR and the managed device is in anomalous operation; and modifying a first weight of the first attribute such that the CDI is outside the NDIR; and responsive to the managed device being in normal operation, continuing to monitor the current attribute data, wherein a determination that the managed device is in anomalous operation is based on current operational data, and the current operational data includes an acute technical issue reported through a service management system or information identified by an endpoint management system.

12. The non-transitory computer-readable medium of claim 8, wherein:

the identifying the attribute value ranges and the determining the NDIR are performed using a statistical model to standardize values for the NDIR and the attribute value ranges.

13. The non-transitory computer-readable medium of claim 1, wherein:

the first subset of attribute data includes data representative one or more or a combination of: device age, battery status, central processing unit (CPU) usage, memory usage, storage usage, an operating system (OS) update, an OS install date, a boot degradation, a user profile or a portion of the user profile, a system failure indication, a blue screen error notification;

the second subset of attribute data includes data representative one or more or a combination of antivirus status, firewall status, spyware status, data protection indicators, password strength, patch status, user access control status, risk-based vulnerability assessment;

the third subset of attribute data includes data representative one or more or a combination of an incident report, a description and subject of an incident report or ticket, a priority or urgency of an incident report, a mean time to resolve (MTTR), a current status of an incident, a first call resolution, an escalation of an incident, and an inquiry or inquiry response; and the fourth subset of attribute data includes data representative one or more or a combination of an application error, a license status of an application, cloud service usage, cloud service outage, service mapping, application telemetry, application usage indicative of user frustration, an application log, a digital signature of an application, application scan, survey bot inquiries and responses, from survey bots, and information from bots scheduled to logon to application.

14. The non-transitory computer-readable medium of claim 8, further comprising responsive to enrollment of an addition managed device to the managed network applying the determined NDIR to the additional managed device.

* * * * *